(12) United States Patent
Ikeno et al.

(10) Patent No.: US 8,090,887 B2
(45) Date of Patent: Jan. 3, 2012

(54) INPUT SYSTEM ENABLING CONNECTION OF EVEN EXPANSION EQUIPMENT FOR EXPANDING FUNCTION, THAT TRANSMITS RELATIVELY LARGE AMOUNT OF DATA, TO PERIPHERAL EQUIPMENT AND INFORMATION PROCESSING SYSTEM

(75) Inventors: Koji Ikeno, Kyoto (JP); Hitoshi Yamazaki, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 70 days.

(21) Appl. No.: 12/646,222

(22) Filed: Dec. 23, 2009

(65) Prior Publication Data

US 2010/0262718 A1  Oct. 14, 2010

(30) Foreign Application Priority Data

Apr. 14, 2009  (JP) ................ 2009-098213

(51) Int. Cl.
 *G06F 3/00* (2006.01)
 *G06F 13/00* (2006.01)
(52) U.S. Cl. ............... 710/73; 710/14; 710/29; 710/33; 710/36
(58) Field of Classification Search .............. None
 See application file for complete search history.

(56) References Cited

U.S. PATENT DOCUMENTS

| | | | |
|---|---|---|---|
| 5,296,871 A | 3/1994 | Paley | |
| 5,551,701 A | 9/1996 | Bouton et al. | |
| 5,986,644 A | 11/1999 | Herder et al. | |
| 6,126,548 A | 10/2000 | Jacobs et al. | |
| 6,150,947 A | 11/2000 | Shima | |
| 6,280,327 B1 | 8/2001 | Leifer et al. | |
| 6,290,565 B1 | 9/2001 | Galyean III et al. | |
| 6,324,603 B1 * | 11/2001 | Niizuma et al. | 710/72 |
| 6,607,443 B1 | 8/2003 | Miyamoto et al. | |
| 6,712,692 B2 | 3/2004 | Basson et al. | |
| 6,714,189 B2 | 3/2004 | Collins | |
| 7,012,593 B2 | 3/2006 | Yoon et al. | |
| 7,073,129 B1 | 7/2006 | Robarts et al. | |

(Continued)

FOREIGN PATENT DOCUMENTS

AU  9461900  5/1995

(Continued)

OTHER PUBLICATIONS

Payne, J. et al; "3Motion: Unthethered 3D Gesture Interaction", SIGGRAPH '05 ACM 2005.

(Continued)

*Primary Examiner* — Alan Chen
(74) *Attorney, Agent, or Firm* — Nixon & Vanderhye, P.C.

(57) ABSTRACT

A processor determines whether a prescribed period of time has elapsed or not. When the processor has determined that the prescribed period of time has elapsed, the processor determines whether a mode 0 is set or not. When it is determined that the mode 0 is set, a wireless packet including remote controller button data, remote controller acceleration data and remote controller DPD data is generated. Then, the generated wireless packet is transmitted to a game device. When the processor has determined that a mode 1 is set, a wireless packet including remote controller information including the remote controller button data and the remote controller acceleration data and biological information including previous pulse wave data, present pulse wave data and light reception level data, instead of the remote controller DPD data, is generated.

15 Claims, 13 Drawing Sheets

U.S. PATENT DOCUMENTS

| | | |
|---|---|---|
| 7,292,151 B2 | 11/2007 | Ferguson et al. |
| 7,301,648 B2 | 11/2007 | Foxlin |
| 7,351,148 B1 | 4/2008 | Rothschild et al. |
| 7,624,166 B2 | 11/2009 | Foote et al. |
| 7,789,742 B1 | 9/2010 | Murdock et al. |
| 2001/0010514 A1 | 8/2001 | Ishino |
| 2004/0110565 A1 | 6/2004 | Levesque |
| 2005/0009605 A1 | 1/2005 | Rosenberg |
| 2005/0143173 A1 | 6/2005 | Barney et al. |
| 2006/0139327 A1 | 6/2006 | Dawson et al. |
| 2006/0287089 A1 | 12/2006 | Addington et al. |
| 2007/0004514 A1 | 1/2007 | Walker |
| 2007/0049374 A1 | 3/2007 | Ikeda et al. |
| 2008/0174550 A1 | 7/2008 | Laurila et al. |
| 2009/0062006 A1 | 3/2009 | Ikeda et al. |
| 2009/0202114 A1* | 8/2009 | Morin et al. .......... 382/118 |
| 2011/0050569 A1 | 3/2011 | Marvit et al. |

FOREIGN PATENT DOCUMENTS

| | | |
|---|---|---|
| EP | 1 082 981 | 3/2001 |
| JP | 08-010446 | 1/1996 |
| JP | 11-312043 | 11/1999 |
| JP | 2000-135373 | 5/2000 |
| JP | 2002-200339 | 7/2002 |
| JP | 2002-292130 | 10/2002 |
| JP | 2007-83013 | 4/2007 |
| KR | 2001-0016112 | 3/2001 |
| WO | 00/67863 | 11/2000 |
| WO | 2004/111819 | 12/2004 |

OTHER PUBLICATIONS

Cao, X. et al; "VisionWand: Interactions Techniques for Large Display Using a Passive Wand Tracked in 3D", ACM vol. 5, Iss. 2, 2003.

Wilson et al., "XWand: UI for intelligent spaces", Proceedings of the SIGCHI conference on Human factors in computing systems, 2003.

Foxlin et al., "WearTrack: A self-referenced head and hand tracker for wearable computers and portable VR", The Fourth International Symposium on Wearable Computers, 2000.

Ciger et al., "The magic wand", Proceedings of the 19th spring conference on Computer graphics, 2003.

Cheok et al., "Touch-Space Mixed Reality Game Space", Personal and Ubiquitous Computing, vol. 6, Nos. 5-6, 430-442, 2002.

Marrin, "Possibilities for the digital baton as a general-purpose gestural interface", Conference on Human Factors in Computing Systems: CHI '97 extended abstracts on Human factors in computing systems: looking to the future, 1997.

Abaci et al., "Magic wand and the Enigma of the Sphinx", Computers & Graphics, vol. 28, Issue 4, Aug. 2004.

Kranz et al., "A Display Cube as a Tangible User Interface", Adjunct Proceedings of Ubicomp 2005.

Gaitatzes et al., "Reviving the past Cultural heritage meets virtual reality", Proceedings of the 2001 conference on Virtual reality, archeology, and cultural heritage, 2001.

Magerkurth, C. et al., "Pervasive Games: Bringing Computer Entertainment to the Real World", ACM Computers in Entertainment, vol. 3, No. 3, Jul 2005.

Hashimoto, N. et al., "A Novel Immersive Virtual Environment for Human-Scale Interaction", IEEE 2004.

Ohashi, T. et al., "Multimodal Interface with Speech and Motion of Stick CoSMoS", Dept. of Artificial Intelligence, Kyush Inst. Of Technology, Japan 1995.

"Sports Sciences introduces PC version of Batter Up and Car-Racing Simulation Same at Consumer Electronics Show", Business Wire, Jan. 1995.

"Tiger Electronics Sports Feel Tennis", Model 66-007 Manual, 1998.

Hind, N., "Cosmos: A Composition for Live Electronic Instruments Controlled by the Radio Baton and Computer Keyboard(Macintosh)", vol. 5906A of Dissertations Abstracts International, p. 1825, 1998.

Boulanger, R. et al, "Symbiotic Systems: MAX Performance for Radio Baton, MIDI Power Glove, and Acoustic Instrument"; 5th Biennial Symposium Arts and Technology, 1995.

Ohashi, T. et al, "A gesture recognition method for a stick input system", Transactions of the Information Processing Society of Japan, vol. 40, No. 2, Feb. 1999 (Abstract).

"From the Editor: Market Opportunities Abound for Robust Sensors that can be Manufactured at Lower Cost", Sensor Business Digest, v. 11, n. 4, Jun. 2002.

Beck, R., "Toying with Technology/Prices go Lower and Play Items get Smarter", Austin American-Statesman, Tuesday Feb. 9, 1999.

Machine Translation of JP 2000-135373.

* cited by examiner

FIG.11
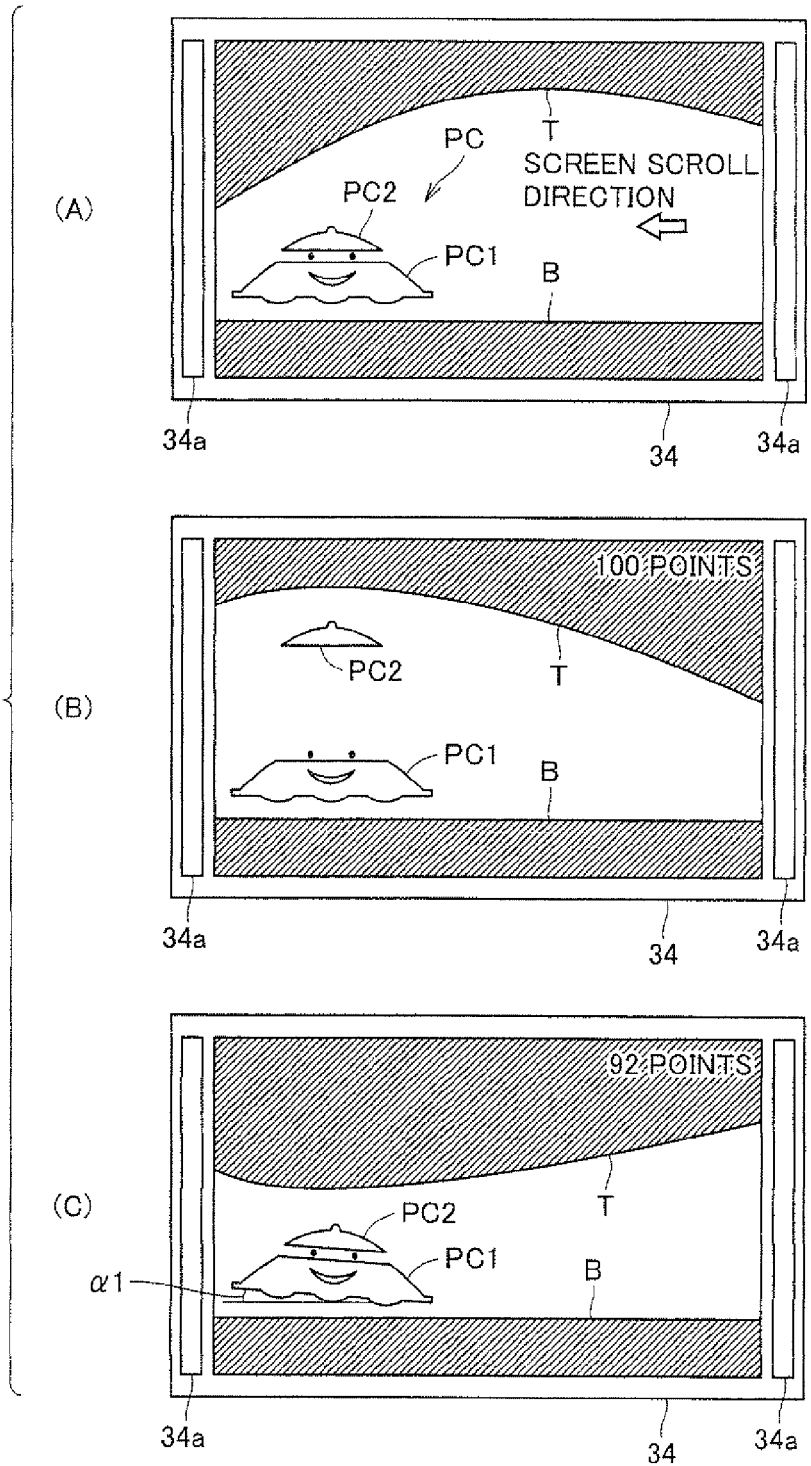
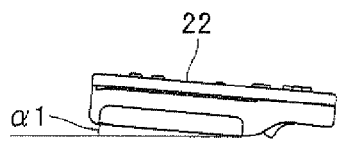

FIG. 13

| | REMOTE CONTROLLER INFORMATION | | | BIOLOGICAL INFORMATION | |
|---|---|---|---|---|---|
| | BUTTON | ACCELERATION | DPD | PULSE WAVE | LIGHT RECEPTION LEVEL (WHETHER FINGER IS ATTACHED OR NOT) |
| MODE 0 | ◎ | ◎ | ◎ | × | × |
| MODE 1 | ◎ | ◎ | × | MANAGEMENT OF TIME IS POSSIBLE BASED ON TIME STAMP SAMPLING RATE: 1 KHz RESOLUTION: 10 bits COMPENSATION IS POSSIBLE WHEN WIRELESS PACKET IS LOST ONCE (ONE PACKET STORES PREVIOUS DATA AND PRESENT DATA) | SAMPLING RATE: 200Hz RESOLUTION: 10 bits |
| MODE 2 | ◎ | × | ◎ | MANAGEMENT OF TIME IS POSSIBLE BASED ON TIME STAMP SAMPLING RATE: 1 KHz RESOLUTION: 10 bits COMPENSATION IS IMPOSSIBLE WHEN WIRELESS PACKET IS LOST (ONE PACKET STORES ONLY PRESENT DATA) | SAMPLING RATE: 200Hz RESOLUTION: 8 bits |
| MODE 3 | ◎ | ◎ | ◎ | MANAGEMENT OF TIME IS POSSIBLE BASED ON TIME STAMP SAMPLING RATE: 1 KHz RESOLUTION: 8 bits COMPENSATION IS IMPOSSIBLE WHEN WIRELESS PACKET IS LOST (ONE PACKET STORES ONLY PRESENT DATA) | × |

US 8,090,887 B2

INPUT SYSTEM ENABLING CONNECTION OF EVEN EXPANSION EQUIPMENT FOR EXPANDING FUNCTION, THAT TRANSMITS RELATIVELY LARGE AMOUNT OF DATA, TO PERIPHERAL EQUIPMENT AND INFORMATION PROCESSING SYSTEM

This nonprovisional application is based on Japanese Patent Application No. 2009-098213 filed with the Japan Patent Office on Apr. 14, 2009, the entire contents of which are hereby incorporated by reference.

BACKGROUND OF THE INVENTION

1. Field of the Invention

The present invention relates to an input system enabling connection of expansion equipment capable of expanding a function to peripheral equipment and to an information processing system.

2. Description of the Background Art

A configuration enabling expansion of a function by further connecting expansion equipment to peripheral equipment for an information processing device serving as a main unit has conventionally been adopted. For example, Japanese Patent Laying-Open No. 11-312043 discloses such a configuration that a slot for attaching a peripheral equipment unit is formed in a keyboard and a functional unit can be operated at hand of a user as it is attached to the slot.

In addition, Japanese Patent Laying-Open No. 2007-83013 shows a configuration in which an expansion controller is attached to a "Wii® remote controller." The Wii® remote controller includes a three-axis motion sensor for detecting inclination of the remote controller itself or change in motion. A "nunchaku", which is an expansion controller, also includes a three-axis motion sensor. The Wii® remote controller serving as a main controller is provided with an expansion connector, and the nunchaku representing the expansion controller is connected to the Wii® remote controller through this expansion connector.

In one game, a user performs an operation by moving the WHO remote controller while holding the Wii® remote controller with one hand. In another game, a user can perform an operation by moving the Wii® remote controller and the nunchaku while holding the Wii® remote controller with one hand and holding the nunchaku with the other hand.

Meanwhile, in a configuration above, it is the Wii® remote controller representing the peripheral equipment that directly transmits and receives data to and from the information processing device, and the Wii® remote controller representing the peripheral equipment exchanges both of operation data of the remote controller itself and operation data of the expansion equipment with the information processing device serving as the main unit.

On the other hand, an amount of data that can be communicated from the Wii® remote controller representing the peripheral equipment to the information processing device serving as the main unit is limited. Therefore, there has been a problem that equipment transmitting a large amount of data cannot be connected as the expansion equipment to the peripheral equipment.

SUMMARY OF THE INVENTION

The present invention was made to solve the above-described problems. An object of the present invention is to provide an input system enabling connection even of expansion equipment for expanding a function, that transmits a relatively large amount of data, to peripheral equipment, and an information processing system.

An input system constituted of peripheral equipment (22: a reference numeral used in embodiments; to be understood similarly hereinafter) for transmitting data to an information processing device (12) and expansion equipment (78) that can be connected to the peripheral equipment, according to a first aspect of the present invention, is provided. The peripheral equipment includes a first data generation unit (80) for generating first input data (Dd) and a communication unit (75) capable of transmitting a prescribed amount of transmission data to the information processing device. The expansion equipment includes an expansion equipment data generation unit (761) for generating expansion equipment data (Dv0). The communication unit transmits, in a first mode, the first input data generated by the first data generation unit in such a manner that it is included in the transmission data, and transmits, in a second mode, the expansion equipment data input from the expansion equipment in such a manner that it is included in the transmission data, instead of the first input data.

According to the first aspect, while the second mode (a mode 1) is set, instead of remote controller DPD data included in a packet as input data to be transmitted while a first mode (a mode 0) is set, biological information data output from a vital sensor is included in the packet as the input data. Therefore, even when a relatively large amount of data such as biological information data is transmitted while an amount of transmitted data is limited, such large data can be transmitted by including that data in a packet instead of the remote controller DPD data. Namely, even expansion equipment for expanding a function, that transmits a relatively large amount of data, can be connected to peripheral equipment. Thus, devices that can be connected as the expansion equipment can be various.

According to a preferred second aspect, the peripheral equipment further includes a second data generation unit (74) for generating second input data (Dc). The communication unit transmits, in the first mode, the first and second input data in such a manner that they are included in the transmission data, and transmits, in the second mode, the second input data generated by the second data generation unit and the expansion equipment data in such a manner that they are included in the transmission data.

According to the second aspect, while the second mode (mode 1) is set, the biological information data output from the vital sensor and remote controller acceleration data are included in a packet as the input data. Therefore, by including the remote controller acceleration data in the packet together with the biological information data, the number of types of input data input to the information processing device increases, so that a game operation higher in a degree of freedom can be performed in such an application as a game.

According to a preferred third aspect, the communication unit establishes wireless communication with the information processing device.

According to the third aspect, by establishing wireless communication with the information processing device, operability of a controller is further improved.

According to a preferred fourth aspect, the expansion equipment and the peripheral equipment are connected through a wire (79) to each other.

According to the fourth aspect, the vital sensor and the controller are connected through the wire to each other. Accordingly, it is not necessary to take into account radio wave interference between the vital sensor and the communication unit of the controller during data transmission from the vital sensor to the controller, and data can be output from the vital sensor to the controller in a stable manner.

According to a preferred fifth aspect, the communication unit has a transmission data generation unit (70) for generating the transmission data. In a third mode, the transmission data generation unit generates reduced expansion equipment data obtained by reducing a data amount of the expansion equipment data input from the expansion equipment and generates the transmission data including the first input data and the reduced expansion equipment data.

According to a preferred sixth aspect, the communication unit has a transmission data generation unit (70) for generating the transmission data. In a third mode, the transmission data generation unit generates reduced expansion equipment data obtained by reducing a data amount of the expansion equipment data input from the expansion equipment and generates the transmission data including the first and second input data and the reduced expansion equipment data.

According to the fifth or sixth aspect, in order to reduce the data amount of the biological information data input from the vital sensor, the data amount of the biological information data is suppressed. Then, the biological information data is transmitted to the information processing device together with DPD data and the like. Thus, transmission making effective use of a transmittable amount of data can be achieved, and data transmission adapted to various applications different in type of input data can be achieved.

According to a preferred seventh aspect, the expansion equipment data includes compensation data (Df1) for compensating for data. The transmission data generation unit (70; S18, S20) generates, in the third mode, reduced expansion equipment data (Dv1) without including the compensation data.

According to the seventh aspect, as the biological information data includes the compensation data, even when a preceding wireless packet is lost due to packet loss, the packet loss can be compensated for because immediately preceding biological information data is included. Namely, even when packet loss occurs due to communication failure, reproducibility of a user's biological signal can be ensured in the information processing device and processing in the information processing device can smoothly be performed.

According to a preferred eighth aspect, the expansion equipment data generation unit outputs a plurality of pieces of data in accordance with a sampling frequency that can be adjusted in response to an instruction to the peripheral equipment. The transmission data generation unit indicates adjustment of the sampling frequency of the expansion equipment.

According to a preferred ninth aspect, the expansion equipment data is constituted of a plurality of pieces of data each constituted of a plurality of bits. The transmission data generation unit (70; S24, S26) generates the reduced expansion equipment data (Dh4) in which the number of bits in each piece of data has been reduced.

According to a preferred tenth aspect, the reduced expansion equipment data is smaller in a data amount than the expansion equipment data.

According to the eighth to tenth aspects, the data amount of the biological information data input from the vital sensor can be reduced in a simplified manner.

According to a preferred eleventh aspect, the first input data is coordinate indication data (Dd).

According to the eleventh aspect, as the expansion equipment data instead of the remote controller DPD data is included in the transmission data, the expansion equipment data relatively large in a data amount, which is as large as the remote controller DPD data, can be transmitted.

According to a preferred twelfth aspect, the peripheral equipment includes an image pick-up portion (80c) for obtaining picked-up image data. The first input data is the picked-up image data itself obtained by the image pick-up portion or data obtained by subjecting the picked-up image data obtained by the image pick-up portion to prescribed operation processing.

According to the twelfth aspect, instead of the picked-up image data itself or the data obtained by subjecting the picked-up image data to prescribed operation processing, the expansion equipment data is included in the transmission data. Therefore, the expansion equipment data relatively large in a data amount can be transmitted.

According to a preferred thirteenth aspect, the second input data is acceleration data (Dc).

According to the thirteenth aspect, the biological information data output from the vital sensor and the remote controller acceleration data are included in a packet as the input data. Therefore, by including the remote controller acceleration data in the packet together with the biological information data, the number of types of input data input to the information processing device increases, so that a game operation higher in a degree of freedom can be performed in such an application as a game.

According to a preferred fourteenth aspect, the expansion equipment data is biological information data (Dv0).

According to the fourteenth aspect, a relatively large amount of data such as the biological information data can be transmitted.

An information processing system (1) according to a fifteenth aspect of the present invention includes an information processing device (12), operation equipment (22) for the information processing device, and expansion equipment (78) that can be connected to the operation equipment. The operation equipment includes an operation data generation unit (26) for generating operation data, a coordinate indication data generation unit (80) for generating coordinate indication data, and a communication unit (75) capable of transmitting a prescribed amount of transmission data to the information processing device. The expansion equipment includes an expansion equipment data generation unit (761) for generating expansion equipment data. The communication unit transmits, in a first mode, the operation data (Db) generated by the operation data generation unit and the coordinate indication data (Dd) generated by the coordinate indication data generation unit in such a manner that they are included in the transmission data, and transmits, in a second mode, the operation data and the expansion equipment data (Dv0) input from the expansion equipment in such a manner that they are included in the transmission data, instead of the coordinate indication data.

According to the fifteenth aspect, while the second mode (mode 1) is set, instead of remote controller DPD data included in a packet as input data to be transmitted while the first mode (mode 0) is set, biological information data output from a vital sensor is included in the packet as the input data. Therefore, even when a relatively large amount of data such as biological information data is transmitted while an amount of transmitted data is limited, such large data can be transmitted by including that data in a packet instead of the remote controller DPD data. Namely, even expansion equipment for expanding a function, that transmits a relatively large amount of data, can be connected to peripheral equipment. Thus, an information processing system in which devices that can be connected as the expansion equipment are various can be realized.

In the description above, for better understanding of the present invention, reference numerals, supplemental explanation and the like for showing correspondence with embodiments which will be described later are provided, however, they are not intended to limit the present invention in any manner.

According to the present invention, a function can be expanded by connecting even expansion equipment, that transmits and receives a relatively large amount of data, to peripheral equipment.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 11 is a diagram illustrating a game using vital sensor 78.

FIG. 13 is a diagram illustrating a data configuration of a wireless packet in a format in compliance with each mode.

DESCRIPTION OF THE PREFERRED EMBODIMENTS

Figure 1:
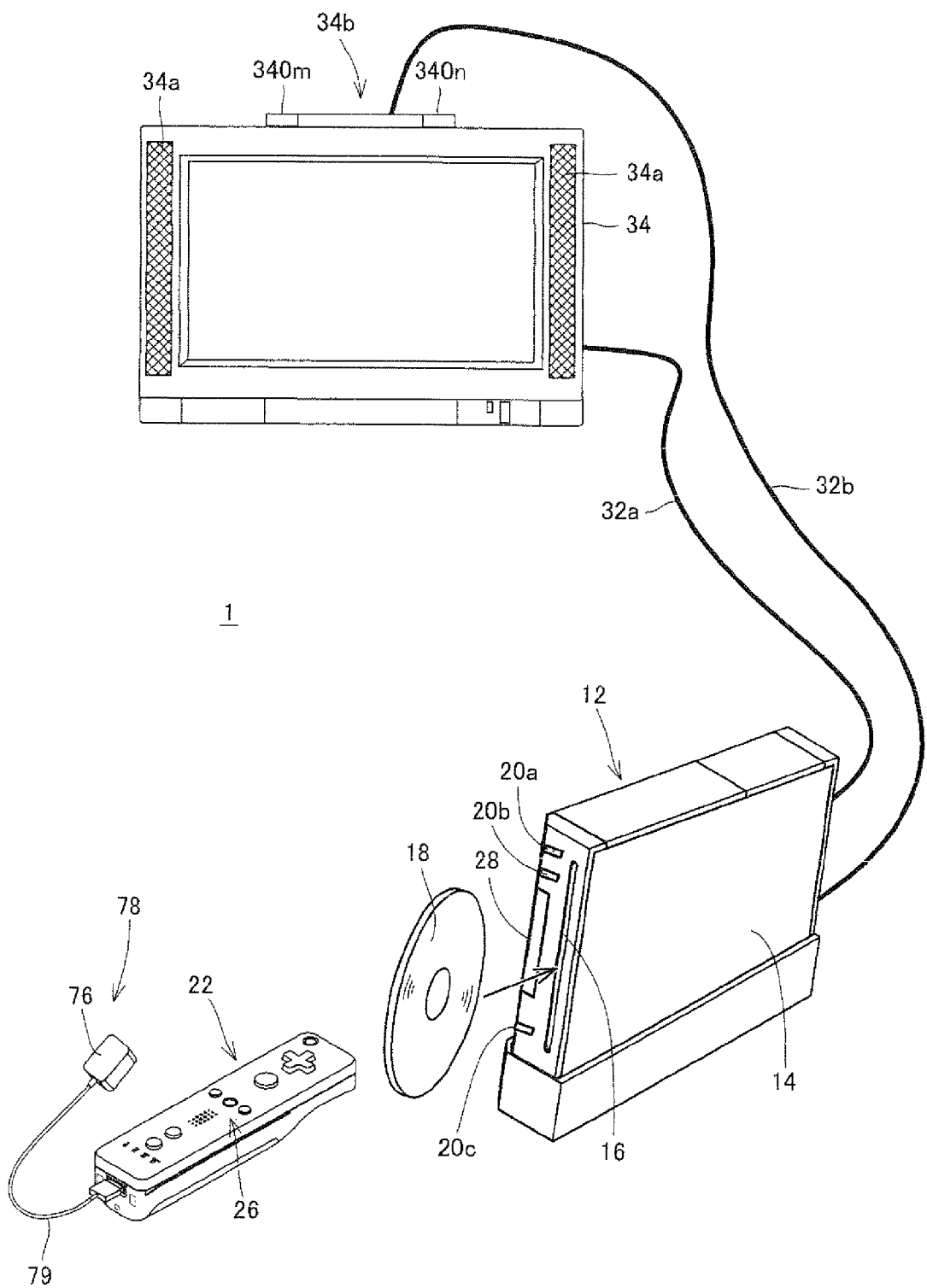
FIG. 1 is a diagram illustrating a video game system 1 representing one type of an information processing system according to an embodiment of the present invention.

An embodiment of the present invention will be described in detail with reference to the drawings. The same or corresponding elements in the drawings have the same reference characters allotted, and description thereof will not be repeated.

<Configuration of Game Device>

A video game system 1 representing one type of an information processing system according to an embodiment of the present invention will be described with reference to FIG. 1.

Referring to FIG. 1, video game system 1 according to the embodiment of the present invention includes a game device 12, a controller 22, and a vital sensor 78. Game device 12 is a stationary game device. Controller 22 represents one type of peripheral equipment for game device 12, that serves as a user's or player's input device or operation device. Vital sensor 78 represents one type of expansion equipment for sensing human biological information and it can be connected to controller 22.

Game device 12 according to the present embodiment is designed to be able to communicate with controller 22. In addition, game device 12 and controller 22 are connected to each other through wireless communication. For example, wireless communication is implemented under Bluetooth® specifications, however, it may be implemented under other specifications such as infrared or wireless LAN. Alternatively, wire connection may be adopted.

Game device 12 includes a housing 14 in a substantially parallelepiped shape, and a disc slot 16 is provided in a front surface of housing 14. An optical disc 18 typically representative of a storage medium for storing a game program or the like is inserted in disc slot 16 and attached to a disc drive 54 (see FIG. 2) within housing 14. An LED and a light guide plate are arranged around disc slot 16, and the LED can illuminate in response to various processes.

In addition, in the front surface of housing 14 of game device 12, a power button 20a and a reset button 20b are provided in an upper portion thereof and an eject button 20c is provided in a lower portion thereof. Moreover, a connector cover 28 for an external memory card is provided between reset button 20b and eject button 20c, in the vicinity of disc slot 16. An external memory card connector 62 (see FIG. 2) is provided inside connector cover 28 for external memory card, in which a not-shown external memory card (hereinafter simply also referred to as a "memory card") is inserted. The memory card is used for temporarily storing a game program or the like that is read from optical disc 18 and loaded, or it is used for storing (saving) game data of the game played with this video game system 1 (data of a game result or data while playing the game). The game data above, however, may be stored in an internal memory such as a flash memory 44 (see FIG. 2) provided inside game device 12, instead of the memory card. In addition, the memory card may be used as a back-up memory for the internal memory. Further, the game program or the like may be supplied (downloaded) to game device 12 from a server or the like connected to the network through a wire or wireless communication channel. The game program or the like thus downloaded is stored in flash memory 44 (see FIG. 2) or a memory card provided in game device 12.

A general-purpose SD (Secured Digital) card may be employed as the memory card, however, other general-purpose memory cards such as a memory stick or a multimedia card (trademark) may also be employed.

An AV cable connector 58 (see FIG. 2) is provided on a rear surface of housing 14 of game device 12. An AV cable 32a is connected to AV connector 58, and a monitor 34 (a display portion) and a speaker 34a (an audio output portion) are connected to game device 12 through this AV cable 32a. Monitor 34 and speaker 34a are typically implemented by a color television. AV cable 32a inputs a video signal from game device 12 to a video input terminal of the color television and inputs an audio signal to an audio input terminal. Therefore, for example, a game image of a three-dimensional (3D) video game is displayed on a screen of color television (monitor) 34 and stereophonic game sound such as game music or sound effect is output from left and right speakers 34a. In addition, a marker portion 34b having two infrared LEDs (markers) 340m and 340n is provided around monitor 34 (in the example shown in FIG. 1, on the top of monitor 34). Marker portion 34b is connected to game device 12 through a power cable 32b. Therefore, marker portion 34b is supplied with power from game device 12. Thus, markers 340*m* and 340*n* emit light and output infrared rays from the front of monitor 34.

Game device 12 is supplied with power by a general AC adapter (not shown). The AC adapter is inserted in an ordinary wall outlet at home and power supply for home (commercial power supply) is converted to a low DC voltage signal suitable for driving game device 12. In other implementations, a battery may be employed as the power supply.

When the user plays a game (or another application, without limited to the game) with this video game system 1, the user initially turns on power of game device 12, selects appropriate optical disc 18 recording a program of a video game (or another application the user desires to play), and loads optical disc 18 to disc drive 54 of game device 12. Then, game device 12 starts execution of the video game or another application based on the program recorded on that optical disc 18. Alternatively, game device 12 may start execution of the video game or another application based on a program downloaded in advance from the server and stored in flash memory 44 (see FIG. 2) or the like.

The user operates controller 22 to provide an input to game device 12. For example, by operating any input portion 26, the user starts the game or another application. Further, by moving controller 22 itself other than operating input portion 26, the user can move a motion picture object (a user object) in a different direction or change a point of view of the user (a camera position) in a 3D game world.

An electric configuration of video game system 1 shown in FIG. 1 will be described with reference to FIG. 2.

Figure 2:
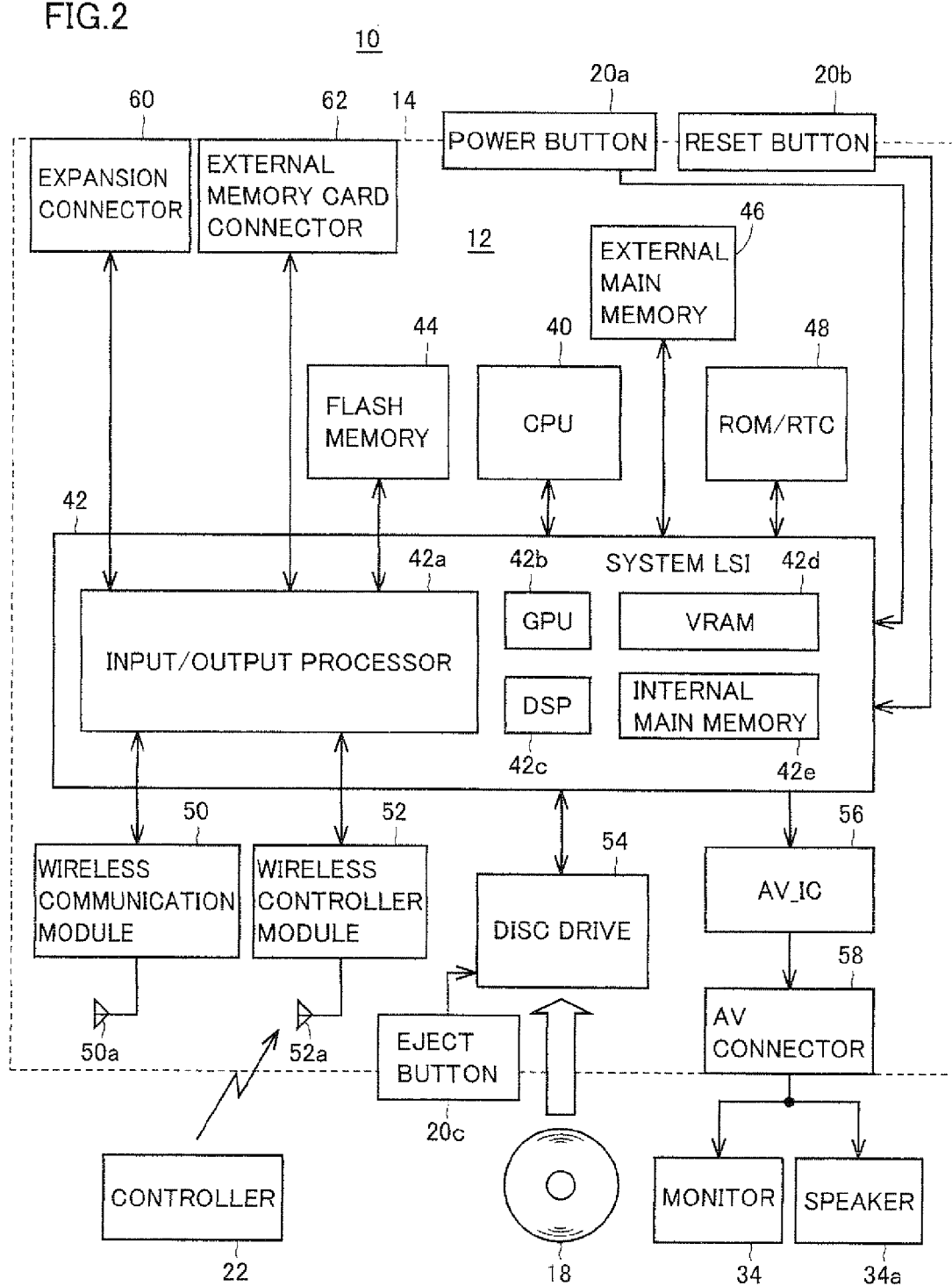
FIG. 2 is a block diagram showing an electric configuration of video game system 1 shown in FIG. 1.

Referring to FIG. 2, each component within housing 14 is mounted on a printed circuit board. As shown in FIG. 2, game device 12 is provided with a CPU 40. CPU 40 functions as a game processor. A system LSI 42 is connected to CPU 40. An external main memory 46, a ROM/RTC 48, disc drive 54, and an AV_IC 56 are connected to this system LSI 42.

External main memory 46 stores a program of various applications or various types of data, and it is used as a work area or a buffer area of CPU 40. ROM/RTC 48 is what is called a boot ROM, and a program for starting up game device 12 is incorporated therein and ROM/RTC 48 is provided with a time counting circuit for counting time. Namely, CPU 40 obtains current time and day (year, month, day, and time) by referring to ROM/RTC 48. Disc drive 54 reads program data, texture data or the like from optical disc 18, and writes such data in an internal main memory 42*e* or external main memory 46 which will be described later under the control of CPU 40.

System LSI 42 includes an input/output processor 42*a*, a GPU (Graphics Processor Unit) 42*b*, a DSP (Digital Signal Processor) 42*c*, a VRAM 42*d*, and internal main memory 42*e*, and these components are connected to one another through an internal bus.

Input/output processor (I/O processor) 42*a* transmits and receives data or downloads data. Transmission and reception and downloading of data will be described later in detail.

GPU 42*b* forms a part of rendering means. Receiving a graphics command (an image creation command) from CPU 40, GPU 42*b* generates game image data in accordance with the command. It is noted that CPU 40 provides an image generation program necessary for generating game image data to GPU 42*b*, in addition to the graphics command.

As described above, VRAM 42*d* is connected to GPU 42*b*. GPU 42*b* obtains data necessary for GPU 42*b* to execute the image creation command (image data: data such as polygon data or texture data) by accessing VRAM 42*d*. It is noted that CPU 40 writes image data necessary for rendering in VRAM 42*d*, by utilizing GPU 42*b*. GPU 42*b* accesses VRAM 42*d* and creates the game image data for rendering.

In the present embodiment, an example where GPU 42*b* generates game image data is described. On the other hand, when some kind of application other than the game application is executed, GPU 42*b* generates image data for that application.

In addition, DSP 42*c* functions as an audio processor and generates audio data corresponding to sound, voice or music to be output from speaker 34*a*, by using sound data or a sound waveform (tone) data stored in internal main memory 42*e* or external main memory 46.

The game image data and the audio data generated as described above are read by AV_IC 56 and output to monitor 34 and speaker 34*a* through AV connector 58. Therefore, a game picture is displayed on monitor 34 and sound (music) necessary for the game is output from speaker 34*a*.

In addition, flash memory 44, a wireless communication module 50 and a wireless controller module 52 as well as an expansion connector 60 and external memory card connector 62 are connected to input/output processor 42*a*. Moreover, an antenna 50*a* is connected to wireless communication module 50 and an antenna 52*a* is connected to wireless controller module 52.

Input/output processor 42*a* can communicate with another game device or various servers connected to the network through wireless communication module 50.

In addition, input/output processor 42*a* receives input data transmitted from controller 22 through antenna 52*a* and wireless controller module 52, and causes internal main memory 42*e* or external main memory 46 to store (temporarily store) the input data in a buffer area thereof. After the input data is used in game processing by CPU 40, it is erased from the buffer area.

In the present embodiment, as described above, wireless controller module 52 communicates with controller 22 under Bluetooth® specifications.

In addition, expansion connector 60 and external memory card connector 62 are connected to input/output processor 42*a*. Expansion connector 60 is a connector for an interface such as a USB or an SCSI, and a medium such as an external storage medium or peripheral equipment such as another controller can be connected. In addition, a wired LAN adapter may be connected to expansion connector 60 and wired LAN can be utilized instead of wireless communication module 50. An external storage medium such as a memory card can be connected to external memory card connector 62. Therefore, for example, input/output processor 42*a* can access the external storage medium to store data therein or to read data therefrom, through expansion connector 60 or external memory card connector 62.

As shown also in FIG. 2, game device 12 (housing 14) is provided with power button 20*a*, reset button 20*b* and eject button 20*c*. Power button 20*a* is connected to system LSI 42. When power button 20*a* is turned on, system LSI 42 supplies power to each component in game device 12 through a not-shown AC adapter and sets a mode in a normally powered state (referred to as a normal mode). On the other hand, when power button 20*a* is turned off, system LSI 42 supplies power only to some components in game device 12 and sets a mode in which power consumption is minimized (hereinafter also referred to as a "stand-by mode"). In the present embodiment, when the stand-by mode is set, system LSI 42 indicates stop of power supply to components other than input/output processor 42*a*, flash memory 44, external main memory 46, ROM/RTC 48, wireless communication module 50, and wireless controller module 52. Therefore, the stand-by mode refers to a mode in which CPU 40 does not execute an application.

Though power is supplied to system LSI 42 even in the stand-by mode, power consumption is lowered by avoiding drive of GPU 42*b*, DSP 42*c* and VRAM 42*d* as a result of stop of supply of a clock thereto.

In addition, a fan for expelling heat of an IC such as CPU 40 or system LSI 42 is provided in housing 14 of game device 12. In the stand-by mode, this fan is also stopped. If the user does not wish to use the stand-by mode, setting for not using the stand-by mode may be made so that power supply to all circuit components is completely stopped as power button 20*a* is turned off.

In addition, switching between the normal mode and the stand-by mode may also be made remotely by switching on and off a power switch 26*h* of controller 22. When such a remote operation is not performed, such setting that power is not supplied to wireless controller module 52 in the stand-by mode may be made.

Reset button 20*b* is also connected to system LSI 42. When reset button 20*b* is pressed, system LSI 42 re-starts a start-up program of game device 12. Eject button 20*c* is connected to disc drive 54. When eject button 20*c* is pressed, optical disc 18 is ejected from disc drive 54.

<Configuration of Controller>

FIGS. 3(A) to 3(E) show exemplary appearance of controller 22. FIG. 3(A) shows a tip end surface of controller 22, FIG. 3(B) shows an upper surface of controller 22, FIG. 3(C) shows a right side surface of controller 22, FIG. 3(D) shows a lower surface of controller 22, and FIG. 3(E) shows a rear end surface of controller 22.

Referring to FIGS. 3(A) to 3(E), controller 22 has a housing 22*a* formed, for example, by plastic molding. Housing 22*a* is in a substantially parallelepiped shape and has such a size as being held by the user with one hand. Housing 22*a* (controller 22) is provided with input means (a plurality of buttons or switches) 26. Specifically, as shown in FIG. 3(B), a cross key 26*a*, a 1 button 26*b*, a 2 button 26*c*, an A button 26*d*, a − button 26*e*, a HOME button 26*f*, a + button 26*g*, and power switch 26*h* are provided on the upper surface of housing 22*a*. In addition, as shown in FIGS. 3(C) and 3(D), an inclined surface is formed in the lower surface of housing 22*a*, where a B trigger switch 26*i* is provided.

Cross key 26*a* is a four-directional push switch, and it includes operation portions pointing to four directions shown with arrows, that is, front (or up), rear (or down), right, and left. As the user operates any one of these operation portions, a direction of movement of a character or an object (a user character or a user object) operable by the user can be indicated or a direction of movement of a cursor can be indicated.

Each of 1 button 26*b* and 2 button 26*c* is a push-button switch. For example, these buttons are used for a game operation such as adjustment of a position of a viewpoint or a direction of viewpoint, that is, a position or a field angle of a virtual camera, for example, in displaying a three-dimensional game image. Alternatively, 1 button 26*b* and 2 button 26*c* may be used for an operation the same as that with A button 26*d* and B trigger switch 26*i*, respectively, or for an auxiliary operation.

A button 26*d* is a push-button switch, and it is used for causing the user character or the user object to perform an operation other than indication of a direction, that is, any action including hitting (punching), throwing, catching (grasping), riding, jumping, or the like. For example, in an action game, jumping, punching, actuating a weapon, or the like can be indicated. Alternatively, in a role-playing game (RPG) or simulation RPG, acquiring of an item, selection and determination of a weapon or a command, or the like can be indicated.

Each of − button 26*e*, HOME button 26*f*, + button 26*g*, and power switch 26*h* is also a push-button switch. − button 26*e* is used for selecting a game mode. HOME button 26*f* is used for displaying a game menu (a menu screen). + button 26*g* is used for starting (resuming) a game or causing the game to pause. Power switch 26*h* is used for turning on/off power of game device 12 by remote operation.

In the present embodiment, a power switch for turning on/off controller 22 itself is not provided, and controller 22 is configured such that it is turned on by operating any input portion 26 of controller 22 and it is automatically turned off in the absence of an operation for a prescribed period (for example, 30 seconds) or longer.

B trigger switch 26*i* is also a push-button switch, and it is mainly used for providing an input simulating a trigger such as shooting a gun or for designating a position selected by controller 22. In addition, by keeping pressing B trigger switch 26*i*, an operation of the user object or a parameter can also be maintained in a prescribed state. In addition, in a prescribed case, B trigger switch 26*i* functions similarly to a normal B button, and it is used for canceling an action selected by using A button 26*d*.

In addition, as shown in FIG. 3(E), an external expansion connector 22*b* is provided in the rear end surface of housing 22*a*, and as shown in FIG. 3(B), an indicator 22*c* is provided on the upper surface of housing 22*a*, toward the side of the rear end surface. External expansion connector 22*b* is used, for example, for connection to vital sensor 78 representing expansion equipment which will be described later. Indicator 22*c* is constituted, for example, of four LEDs. Illumination of any one of these four LEDs can indicate identification information (a controller number) of controller 22 corresponding to the illuminating LED or indicate a state of charge of controller 22 based on the number of illuminating LEDs.

Figure 3:
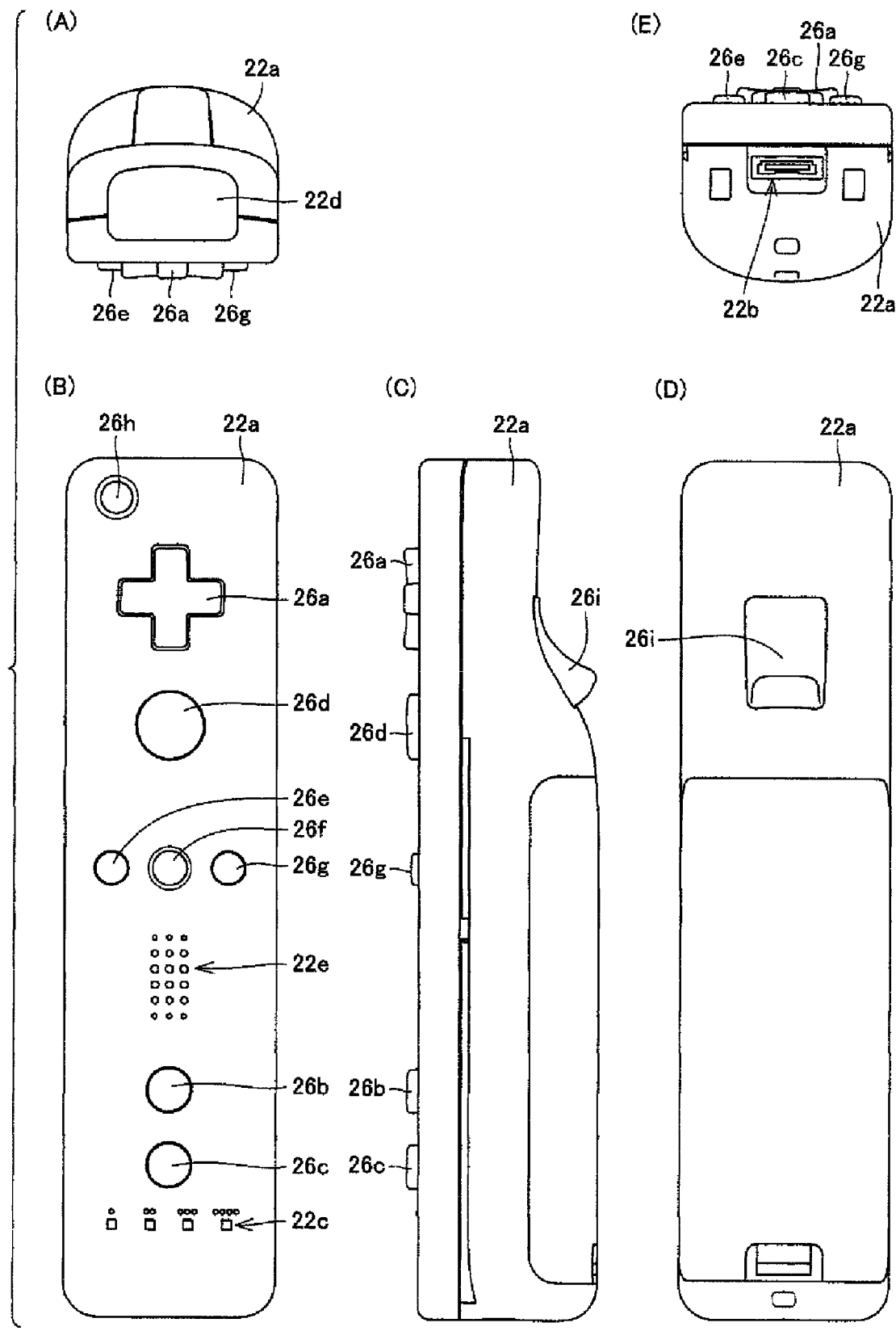
FIG. 3 is a diagram showing exemplary appearance of a controller 22.

Moreover, controller 22 has an image pick-up information operation unit 80 (see FIG. 3), and a light incident port 22*d* of image pick-up information operation unit 80 is provided at the tip end surface of housing 22*a* as shown in FIG. 3(A). Further, controller 22 has a speaker 86 (see FIG. 3). As shown in FIG. 3(B), speaker 86 is provided inside housing 22*a*, in correspondence with a sound emission hale 22*e* provided in the upper surface of housing 22*a*, between 1 button 26*b* and HOME button 26*f*.

The shape of controller 22 and the shape, the number, the position, and the like of input portions 26 shown in FIGS. 3(A) to 3(E) are merely by way of example, and even variation as appropriate thereof is encompassed in the essence of the present invention.

In the present embodiment, controller 22 is used in such a state that it is connected to vital sensor 78 representing the expansion equipment shown in FIG. 1. Specifically, external expansion connector 22*b* provided in the rear end surface of housing 22*a* and a connector of vital sensor 78 are connected to each other.

An electric configuration of controller 22 will mainly be described with reference to FIG. 4.

Figure 4:
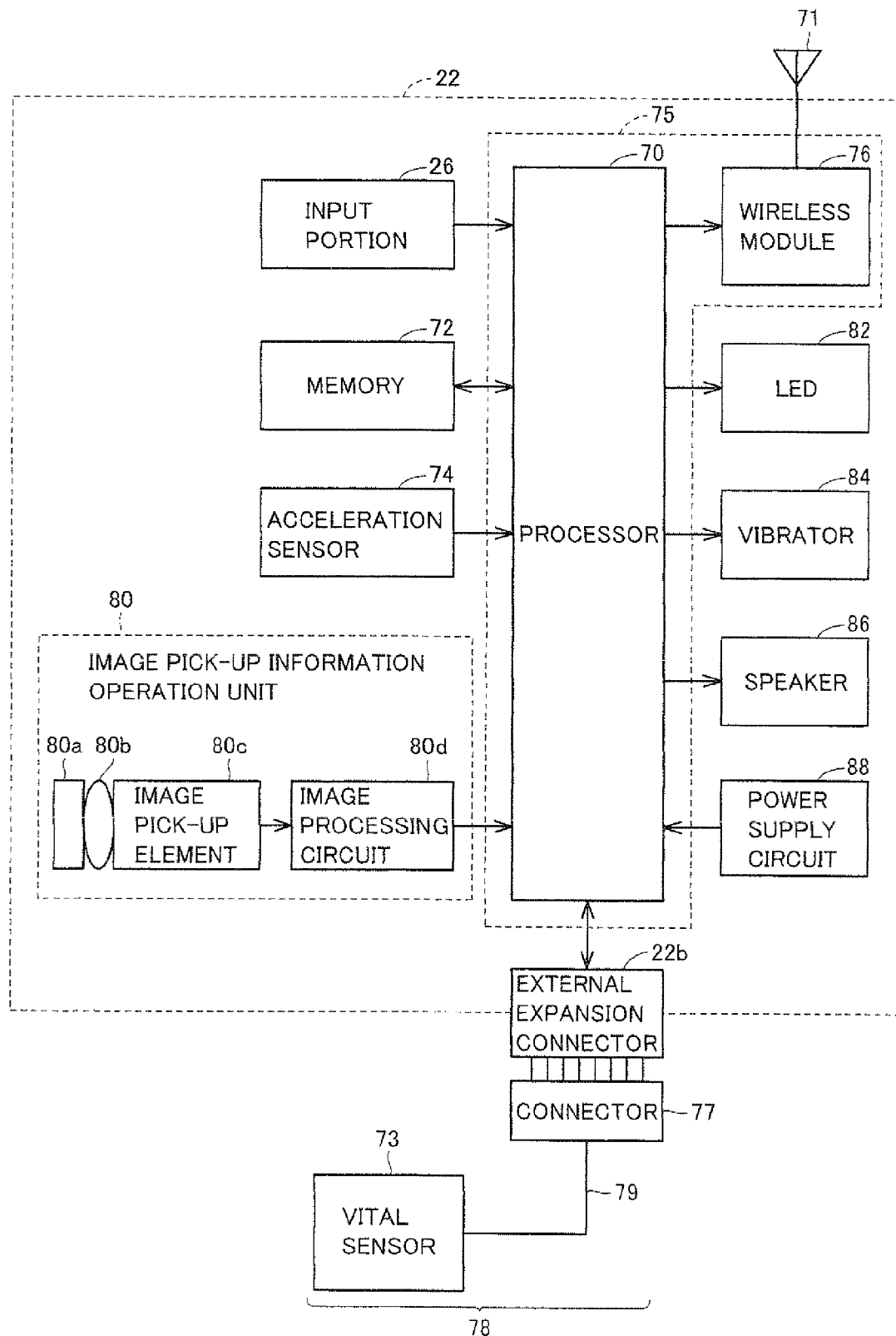
FIG. 4 is a diagram mainly illustrating an electric configuration of controller 22.

Referring to FIG. 4, controller 22 includes a processor 70, to which external expansion connector 22*b*, input portion 26, a memory 72, an acceleration sensor 74, a wireless module 76, image pick-up information operation unit 80, an LED 82 (indicator 22*c*), a vibrator 84, speaker 86, and a power supply circuit 88 are connected through an internal bus (not shown). In addition, an antenna 71 is connected to wireless module 76. Wireless module 76 and processor 70 implement a communication unit 75 for communicating data with game device 12. It is noted that external expansion connector 22b is connected to a connector 77 of vital sensor 78. A vital sensor main body 73 is connected to processor 70 through a cable 79, connector 77, and external expansion connector 22b, so that biological information data from vital sensor main body 73 is input to processor 70. As vital sensor 78 is connected to controller 22 through cable 79, it is not necessary to consider radio wave interference with wireless module 76 of controller 22, and hence data can be output to controller 22 in a stable manner.

Processor 70 is responsible for overall control of controller 22, and it transmits (inputs) as input data, information input from input portion 26, acceleration sensor 74, image pick-up information operation unit 80, and external expansion connector 22b (input information) to game device 12 through wireless module 76 and antenna 71. Here, processor 70 uses memory 72 as a work area or a buffer area.

Input information which is an operation signal (operation data) from input portion 26 (26a to 26i) described above is input to processor 70, which once causes memory 72 to store the operation data.

In addition, acceleration sensor 74 detects each acceleration in three axes of a vertical direction (direction of y-axis), a horizontal direction (direction of x-axis) and a front-rear direction (direction of z-axis) of controller 22. Acceleration sensor 74 is typically a capacitance-type acceleration sensor, however, a sensor of another type may be employed.

For example, acceleration sensor 74 detects acceleration for each of the x-axis, the y-axis and the z-axis (ax, ay, az) every first prescribed time, and inputs the detected acceleration data (acceleration data) to processor 70. For example, acceleration sensor 74 detects acceleration in the direction of each axis in a range from −2.0 G to 2.0 G (G represents acceleration of gravity; to be understood similarly hereinafter). Processor 70 detects acceleration data provided from acceleration sensor 74 every second prescribed time, and causes memory 72 to once store the acceleration data.

In addition, vital sensor 78 inputs biological information data to processor 70 through external expansion connector 22b. Processor 70 causes memory 72 to once store the input biological information data.

Though the description will be given later, processor 70 creates input data including at least one of operation data, acceleration data, marker coordinate data which will be described later, and biological information data, and transmits the created input data to game device 12. Here, wireless communication from the communication unit to wireless controller module 52 included in housing 14 is carried out in a prescribed cycle, however, processing of the game is generally performed in a unit of 1/60 s. Therefore, transmission should be carried out in a cycle shorter than the aforementioned cycle. Specifically, the unit of processing of the game is set to 16.7 ms (1/60 s), and in the present example, a wireless packet is transmitted from controller 22, for example, in a prescribed cycle (1/200 s).

Though not shown in FIGS. 3(A) to 3(E), in the present embodiment, acceleration sensor 74 is provided on a substrate inside housing 22a, around a position where cross key 26a is arranged.

Here, a person skilled in the art could readily understand from the description in the present specification that further information on controller 22 can be estimated or calculated (determined) as a result of processing by such a computer as the processor of game device 12 (such as CPU 40) or the processor of controller 22 (such as processor 70), based on the acceleration data output from acceleration sensor 74.

For example, in an example where a computer side performs processing on the premise that the controller including a one-axis acceleration sensor is in a static state, that is, where it is assumed that acceleration detected by the acceleration sensor consists of only acceleration of gravity, if controller 22 is actually in a static state, whether an attitude of controller 22 is inclined with respect to the direction of gravity or how it is inclined can be determined based on the detected acceleration data. Specifically, if a state that an axis detected by the acceleration sensor is in the vertically downward direction is defined as the reference, inclination can be determined only based on whether 1 G (acceleration of gravity) is applied or not, and magnitude of inclination can be determined based on magnitude of acceleration of gravity.

Alternatively, in a case of a multi-axis acceleration sensor, acceleration data in each axis is further processed so that a degree of inclination with respect to the direction of gravity can be known in further detail. In such a case, processor 70 may perform processing for calculating data of an angle of inclination of controller 22 based on outputs from the acceleration sensors, however, processing may be such that approximate inclination can be estimated based on outputs from the acceleration sensors without processing for calculating inclination angle data. Thus, by combining the acceleration sensor with the processor, an inclination, an attitude or a position of controller 22 can be determined.

On the other hand, in an example where the acceleration sensor is premised on a dynamic state, acceleration in accordance with movement of the acceleration sensor is detected in addition to a component of acceleration of gravity. Therefore, by eliminating the component of acceleration of gravity with prescribed processing, a direction of movement or the like can be determined. Specifically, when controller 22 having the acceleration sensors is moved in a manner dynamically accelerated by a user's hand, the acceleration data generated by the acceleration sensors is processed so that various movements and/or positions of controller 22 can be calculated.

Even in an example where the acceleration sensor is premised on a dynamic state, inclination with respect to the direction of gravity can be determined by eliminating acceleration in accordance with movement of the acceleration sensor with prescribed processing. In another embodiment, the acceleration sensor may incorporate an embedded signal processing device or a dedicated processing device of another type for subjecting an acceleration signal (acceleration data) output from contained acceleration detection means to desired processing prior to output of acceleration data to processor 70. For example, an embedded or dedicated processing device may convert sensed acceleration data into a corresponding inclination angle (or other preferred parameters) if the acceleration sensor serves to detect static acceleration (for example, acceleration of gravity).

Wireless module 76 modulates a carrier wave at a prescribed frequency with input data and emits the resultant weak radio signal from antenna 71, using, for example, the Bluetooth® technique. Namely, input data is modulated by wireless module 76 into a weak radio signal and transmitted from antenna 71 (controller 22). This weak radio signal is received by wireless controller module 52 provided in game device 12 described above. The received weak radio wave is subjected to demodulation and decoding processing, and consequently, game device 12 (CPU 40) can obtain input data from controller 22. Then, CPU 40 performs game processing in accordance with the obtained input data and the program (game program).

In addition, as described above, controller 22 is provided with image pick-up information operation unit 80. Image pick-up information operation unit 80 is constituted of an infrared filter 80a, a lens 80b, an image pick-up element 80c, and an image processing circuit 80d. Infrared filter 80a allows passage of only infrared of light incident from the front of controller 22. As described above, markers 340m and 340n arranged in the vicinity of (around) a display screen of monitor 34 are infrared LEDs for outputting infrared rays from the front of monitor 34. Therefore, an image of markers 340m and 340n can more accurately be picked up by providing infrared filter 80a. Lens 80b collects the infrared rays that have passed through infrared filter 80a and directs the infrared rays toward image pick-up element 80c. Image pick-up element 80c is implemented by a solid-state image pick-up element such as a CMOS sensor or a CCD, and it picks up an image of the infrared rays collected by lens 80b. Therefore, image pick-up element 80c picks up an image only of the infrared rays that have passed through infrared filter 80a to generate image data. An image picked up by image pick-up element 80c is hereinafter referred to as a picked-up image. The image data generated by image pick-up element 80c is processed by image processing circuit 80d. Image processing circuit 80d calculates a position of an image pick-up object (markers 340m and 340n) within the picked-up image and outputs each coordinate value indicating the position to processor 70 as the image pick-up data every third prescribed time. Processing in image processing circuit 80d will be described later.

An exemplary state of playing a game using controller 22 will be described with reference to FIG. 5.

Figure 5:
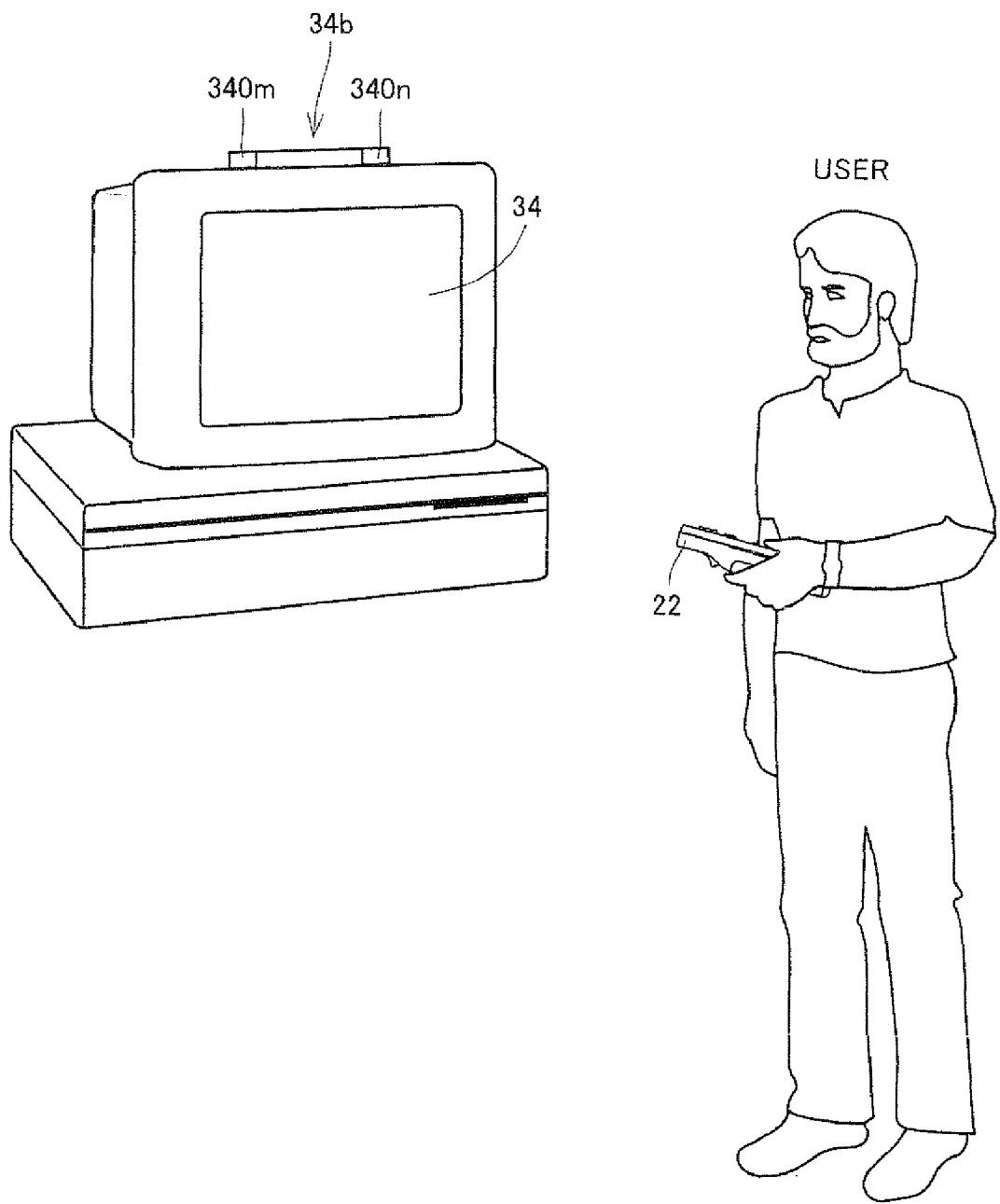
FIG. 5 is a diagram illustrating an exemplary state of playing a game using controller 22.

Referring to FIG. 5, in playing a game using controller 22 in video game system 1, the user holds controller 22 with one hand. Strictly speaking, the user holds controller 22 in such a state that the tip end surface of controller 22 (on the side of port 22d on which light to be picked up by image pick-up information operation unit 80 is incident) is directed toward markers 340m and 340n. As can be seen also from FIG. 1, however, markers 340m and 340n are arranged in parallel to the horizontal direction of the screen of monitor 34. In such a state, the user performs a game operation by changing a position on the screen indicated by controller 22 or by changing a distance between controller 22 and each marker 340m, 340n.

A viewing angle of markers 340m and 340n and controller 22 will be described with reference to FIG. 6.

Figure 6:
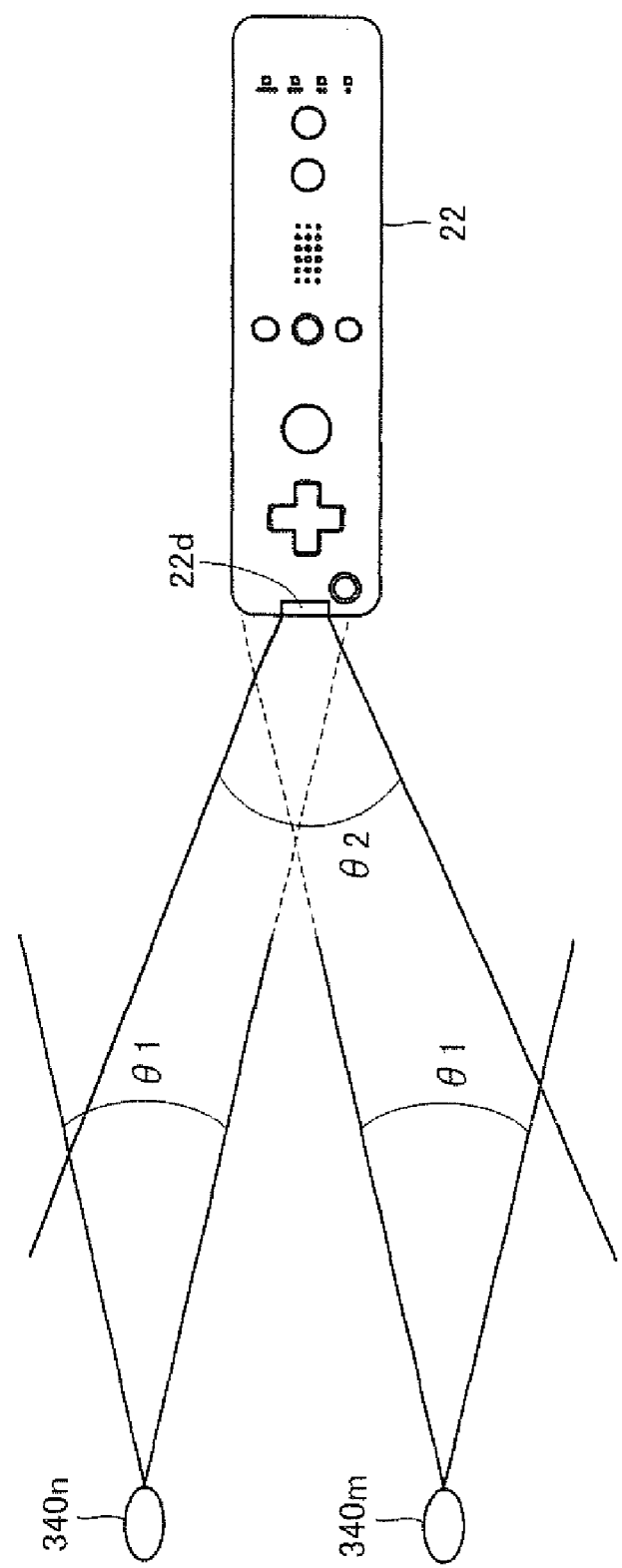
FIG. 6 is a diagram illustrating a viewing angle of markers 340m and 340n and controller 22.

Referring to FIG. 6, each of markers 340m and 340n emits infrared rays in a range of a viewing angle θ1. In addition, image pick-up element 80c of image pick-up information operation unit 80 can receive incident light in a range of a viewing angle θ2, with a direction of line of sight of controller 22 being defined as the center. For example, viewing angle θ1 of markers 340m and 340n is set to 34° (half-value angle), while viewing angle θ2 of image pick-up element 80c is set to 41°. The user holds controller 22 in such a position and an orientation that image pick-up element 80c can receive infrared rays from two markers 340m and 340n. Specifically, the user holds controller 22 such that at least one of markers 340m and 340n is located within viewing angle θ2 of image pick-up element 80c and controller 22 is located in viewing angle θ1 of at least one of markers 340m and 340n. In such a state, controller 22 can sense at least one of markers 340m and 340n. The user can perform a game operation by changing the position and the orientation of controller 22 in a range satisfying this condition.

If the position and the orientation of controller 22 are out of this range, the game operation based on the position and the orientation of controller 22 cannot be performed. Such a range above will hereinafter be referred to as an "effective operation range."

When controller 22 is held within the effective operation range, an image of each marker 340m, 340n is picked up by image pick-up information operation unit 80. Namely, the picked-up image obtained by image pick-up element 80c includes an image of each marker 340m, 340n, which is a target of image pick-up (target image).

An exemplary picked-up image including a target image will be described with reference to FIG. 7.

Figure 7:
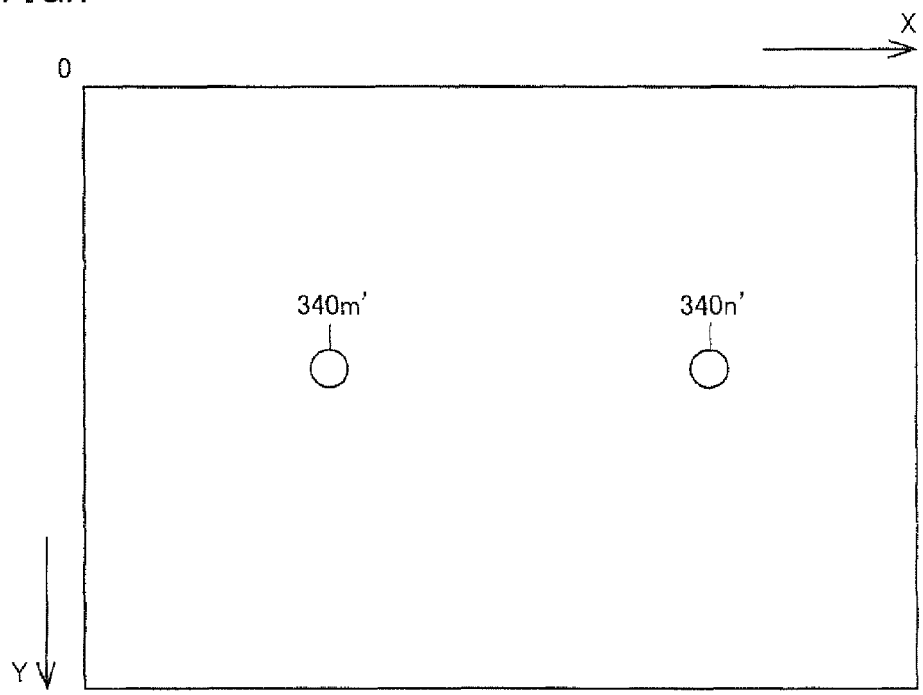
FIG. 7 is a diagram illustrating an exemplary picked-up image including a target image.

Referring to FIG. 7, image processing circuit 80d calculates a coordinate (a marker coordinate) indicating a position of each of markers 340m and 340n on the picked-up image, using the image data of the picked-up image including the target image.

As the target image appears as a high-luminance portion in the image data of the picked-up image, image processing circuit 80d initially detects this high-luminance portion as a candidate for the target image. Then, image processing circuit 80d determines whether that high-luminance portion is the target image or not, based on a size of the detected high-luminance portion. The picked-up image may include not only images 340m' and 340n' of two respective markers 340m and 340n that are the target images but also an image other than the target image due to solar rays passing through a window or light of a fluorescent lamp in a room. Processing for determining whether the high-luminance portion is the target image or not is performed in order to distinguish between images 340m' and 340n' of respective markers 340m and 340n that are the target images and an image other than that and to accurately detect the target image. Specifically, in the determination processing, whether the detected high-luminance portion has a size in a predetermined prescribed range or not is determined. When the high-luminance portion has a size in the prescribed range, the high-luminance portion is determined as representing the target image. In contrast, when the high-luminance portion does not have a size in the prescribed range, the high-luminance portion is determined as representing an image other than the target image.

In addition, image processing circuit 80d calculates a position of the high-luminance portion that has been determined as representing the target image, as a result of the determination processing above. Specifically, the position of the center of gravity of the high-luminance portion is calculated. Here, the coordinate of the position of the center of gravity is referred to as a marker coordinate. In addition, the position of the center of gravity can be calculated on an order higher than resolution of image pick-up element 80c. Here, the resolution of the image picked up by image pick-up element 80c is assumed as 126 dots×96 dots and the position of the center of gravity is calculated on a scale of 1024 dots×768 dots. Namely, the marker coordinate is expressed as an integer value from (0, 0) to (1024, 768).

It is noted that the position in the picked-up image is expressed in a coordinate system (an XY coordinate system) in which the upper left of the picked-up image is defined as the origin, a downward direction is defined as the positive direction of the Y-axis, and a right direction is defined as the positive direction of the X-axis.

In addition, if the target images are properly detected, two high-luminance portions are determined as the target images through the determination processing, and therefore, two marker coordinates are calculated. Image processing circuit 80d outputs data indicating calculated two marker coordinates. The output data of the marker coordinates (marker coordinate data) is included in the input data and transmitted to game device 12 by processor 70, as described above.

When game device 12 (CPU 40) detects the marker coordinate data from the received input data, it can calculate a position indicated by controller 22 on the screen of monitor 34 (an indicated coordinate) and a distance from controller 22 to each of markers 340*m* and 340*n* based on this marker coordinate data. Specifically, the position to which controller 22 is directed, that is, the indicated position, is calculated based on the position of an intermediate point between two marker coordinates. In addition, as the distance between the target images in the picked-up image is varied depending on a distance between controller 22 and markers 340*m*, 340*n*, game device 12 can obtain the distance between controller 22 and markers 340*m*, 340*n* by calculating the distance between the two marker coordinates.

In the present example, the configuration in which image processing circuit 80*d* processes the image data of the picked-up image and the obtained marker coordinate data is transmitted from controller 22 to game device 12 has been described, however, in another example, image data of a photographed image itself may be transmitted from controller 22 to game device 12 and game device 12 may process the image data of the picked-up image to obtain marker coordinate data. In this case, image processing circuit 80*d* provided in controller 22 is not necessary. Alternatively, a configuration may also be such that image data being processed may be transmitted from controller 22 to game device 12. Specifically, data representing luminance, a position, an area, and the like obtained from the image data may be transmitted from controller 22 to game device 12 and CPU 40 of game device 12 may perform remaining processing to obtain marker coordinate data.

In addition, in the present example, a case where markers 340*m* and 340*n* are employed as image pick-up targets of image pick-up information operation unit 80, however, another object may be employed as an image pick-up target. For example, one LED module or three or more LED modules may be provided in the vicinity of monitor 34 and infrared rays from such LED module(s) may be employed as the image pick-up target of image pick-up information operation unit 80. Alternatively, a display screen itself of monitor 34 or another light emission element (such as an interior light) may be employed as the image pick-up target of image pick-up information operation unit 80. Various light emission elements can be employed as the image pick-up target of image pick-up information operation unit 80, by operating a position of controller 22 with respect to the display screen of monitor 34 based on relation of arrangement between the image pick-up target and the display screen of monitor 34.

Vital sensor 78 will now be described with reference to FIG. 8.

Figure 8:
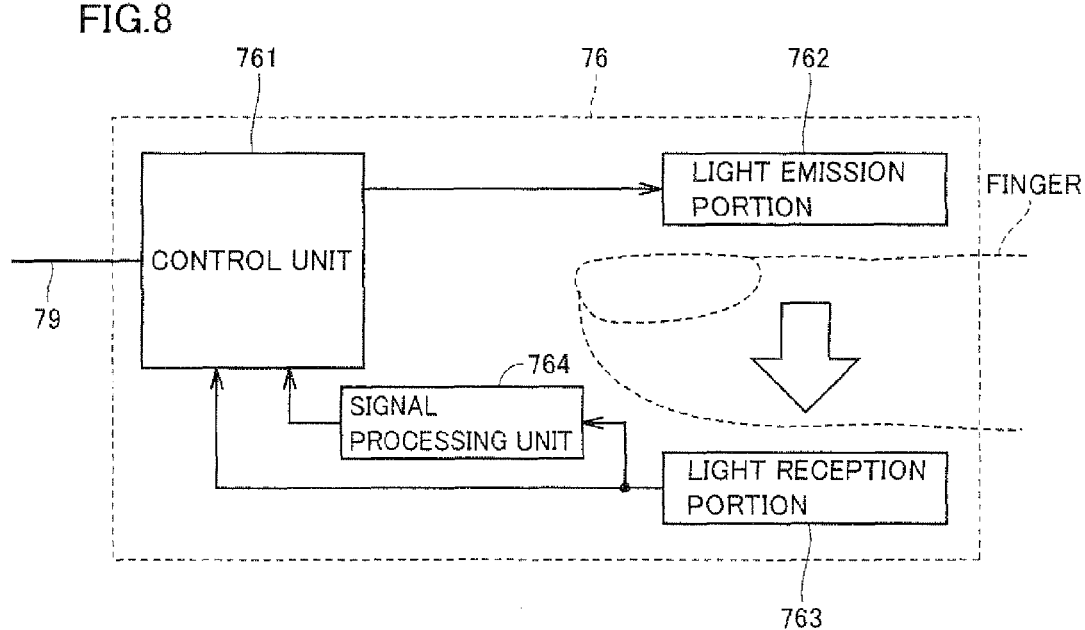
FIG. 8 is a diagram illustrating a vital sensor 78.

Referring to FIG. 8, vital sensor 78 includes a control unit 761, a light emission portion 762 and a light reception portion 763, and a signal processing unit 764.

Light emission portion 762 and light reception portion 763 represent an exemplary sensor for obtaining user's biological information and they implement a transmission-type digital pulse volume sensor. Light emission portion 762 is implemented, for example, by an infrared LED and it emits infrared rays of a prescribed wavelength (for example, 940 nm) toward light reception portion 763. On the other hand, light reception portion 763 receives light having a wavelength emitted by light emission portion 762 and it is implemented, for example, by an infrared photoresistor. Light emission portion 762 and light reception portion 763 are arranged, with a prescribed gap (cavity) lying therebetween.

A light reception signal converted to a photoelectric signal by light reception portion 763 is output to signal processing unit 764 and also directly output to control unit 761.

Here, hemoglobins in blood of a human body tend to absorb infrared rays. For example, a part of a user's body (for example, a fingertip) is inserted in the gap between light emission portion 762 and light reception portion 763 described above. Thus, infrared rays emitted from light emission portion 762 are absorbed by hemoglobins in the inserted fingertip and thereafter received by light reception portion 763. Meanwhile, as an artery of the human body pulsates, a diameter of the artery (an amount of blood) varies in response to pulsation. Therefore, as an artery in the inserted fingertip also similarly pulsates, an amount of blood varies in response to pulsation and an amount of absorbed infrared rays also varies in accordance with the amount of blood. Specifically, when the amount of blood flow in the inserted fingertip is large, the amount of light absorption by hemoglobins also increases and hence a quantity of infrared rays received by light reception portion 763 relatively decreases.

On the other hand, when the amount of blood flow in the inserted fingertip is small, the amount of light absorption by hemoglobins also decreases and hence a quantity of infrared rays received by light reception portion 763 relatively increases. Utilizing such operation principles, a quantity of infrared rays received by light reception portion 763 is converted into a photoelectric signal (a light reception signal) and thereafter the signal is subjected to prescribed filtering processing in signal processing unit 764, so that pulsation of the human body (hereinafter also referred to as a pulse wave) is detected.

A pulse wave signal will be described with reference to FIG. 9.

Figure 9:
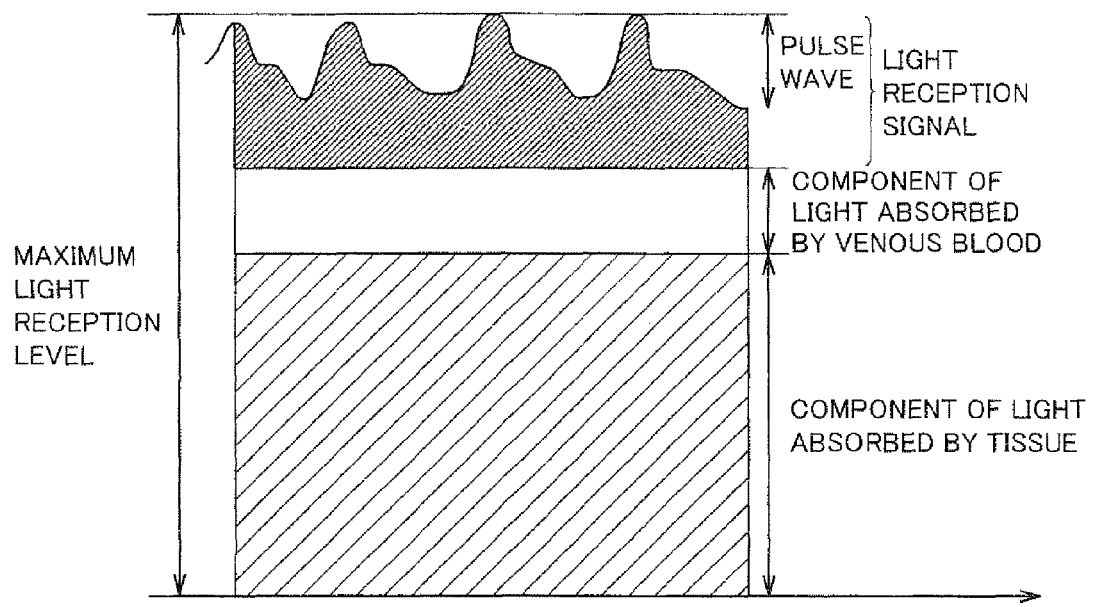
FIG. 9 is a diagram illustrating a pulse wave signal.

Referring to FIG. 9, a light reception signal received by light reception portion 763 refers to a signal indicating remainder after light absorption by venous blood and tissues in a human body relative to a maximum light reception level value.

For example, when the amount of blood flow in the inserted fingertip increases, a value of the light reception signal detected by light reception portion 763 decreases. On the other hand, when the amount of blood flow in the inserted fingertip decreases, a value of the light reception signal detected by light reception portion 763 increases. Thus, a pulse wave portion where a value detected by light reception portion 763 pulsates is generated as the pulse wave signal. Depending on a circuit configuration of light reception portion 763, such a pulse wave signal that a value of the light reception signal detected by light reception portion 763 decreases when the amount of blood flow in the inserted fingertip decreases and a value detected by light reception portion 763 increases when the amount of blood flow in the inserted fingertip increases can also be generated.

It is noted that a pulse wave signal is weak relative to a maximum light reception level as shown in FIG. 9. Therefore, for distinction between a pulse wave signal and a noise signal generated in light reception portion 763, a value of the light reception signal is also detected in the present embodiment.

It is assumed that insertion of a finger in vital sensor 78 is sensed based on this value of the light reception signal (light reception level data).

Control unit 761 is implemented, for example, by an MCU (Micro Controller Unit). Control unit 761 controls a quantity of infrared rays emitted from light emission portion 762. In addition, control unit 761 generates pulse wave data (biological information data) by A/D conversion of the pulse wave signal, that has been subjected to filtering processing by signal processing unit 764, in the light reception signal output from light reception portion 763. Moreover, control unit 761 generates light reception level data (biological information data) by A/D conversion of the light reception signal output from light reception portion 763. It is noted that resolution for A/D conversion is set to 10 bits.

In the present embodiment, it is assumed that a sampling period for generating pulse wave data is set to 1 ms (1/1000 s). In addition, it is also assumed that a sampling period for generating light reception level data is set to 5 ms (1/200 s).

Control unit 761 causes a not-shown buffer to store pulse wave data and light reception level data and outputs the pulse wave data (biological information data) and the light reception level data to controller 22 through cable 79 every prescribed period.

In the present embodiment, it is assumed that transmission timing for control unit 761 to output the pulse wave data (biological information data) and the light reception level data to controller 22 is set to 5 ms (1/200 s).

Therefore, sampled, five pieces of pulse wave data having resolution of 10 bits and one piece of light reception level data having resolution of 10 bits are stored in the buffer by the time when timing of transmission of a packet to controller 22 by control unit 761 comes.

When the transmission timing comes, control unit 761 outputs the biological information data including the sampled, five pieces of pulse wave data having resolution of 10 bits and one piece of light reception level data having resolution of 10 bits to controller 22.

Then, processor 70 of communication unit 75 causes memory 72 to once store the biological information data input through external expansion connector 22b, as described above.

An exemplary state of game play using controller 22 connected to vital sensor 78 will be described with reference to FIG. 10.

Figure 10:
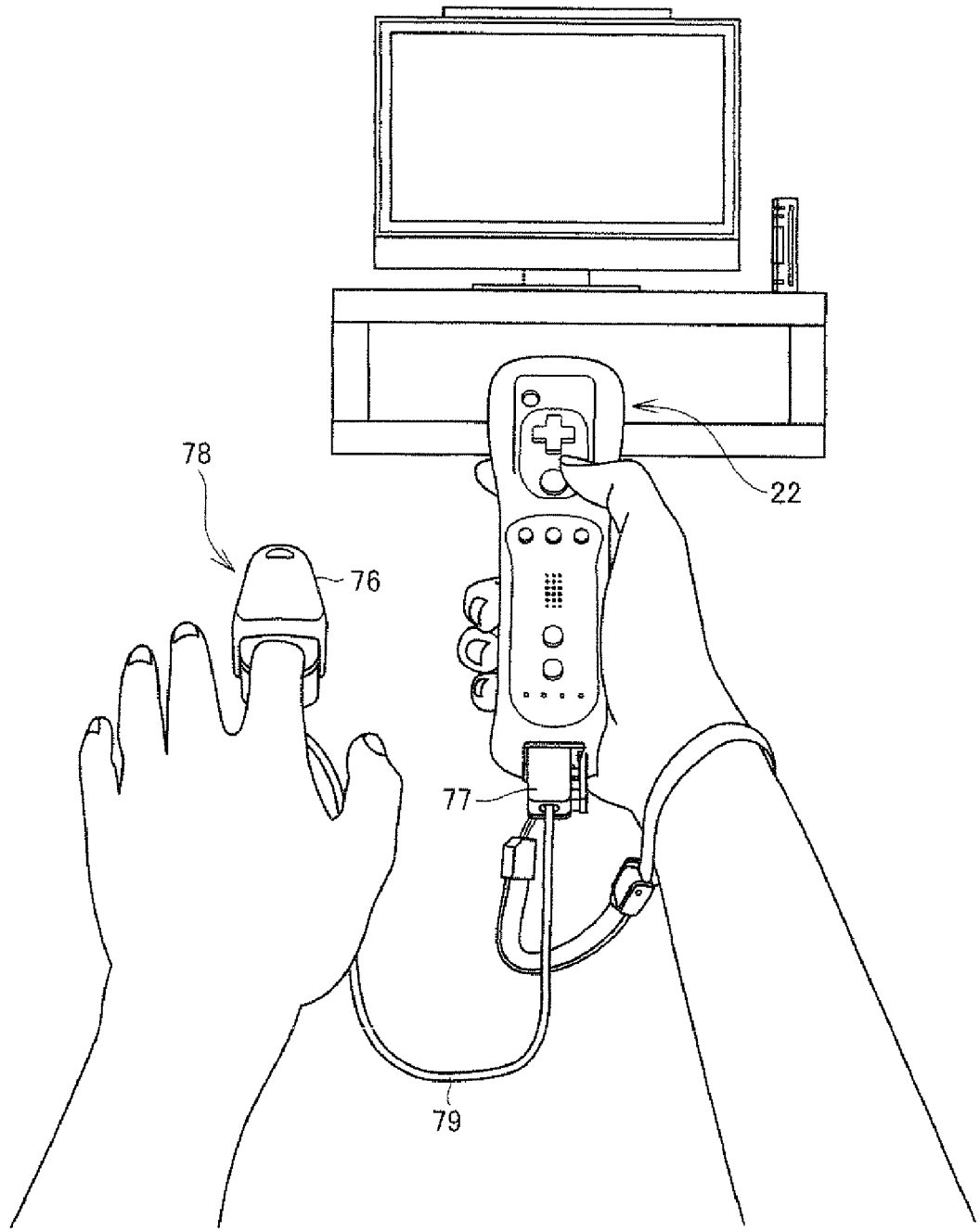
FIG. 10 is a diagram illustrating an exemplary state of game play using controller 22 connected to vital sensor 78.

Referring to FIG. 10, in playing a game using controller 22 connected to vital sensor 78, the user plays the game with his/her one hand holding controller 22 and a finger of the other hand being inserted in vital sensor 78.

In this state, the user performs a game operation by changing a position on a screen indicated by controller 22 or by inclining controller 22.

A game using vital sensor 78 will be described with reference to FIGS. 11(A) to 11(C).

Referring to FIG. 11(A), in this game, for example, a game in which a player character operates based on a biological information signal (pulse wave signal) of the user and on user's movement or attitude (inclination of controller 22) is played. In the present example, a mode of a communication scheme which will be described later is set to mode 1. Namely, remote controller button data, remote controller acceleration data (X, Y, Z), and biological information are transmitted from controller 22 to game device 12.

For example, a player character PC is requested, in a virtual game world, to fly in a space between a ceiling T and a ground B (for example, in a grotto) that scroll from left to right and serve as obstacles.

Player character PC is configured such that it can be divided into a first player character PC1 and a second player character arranged above first player character PC1.

Referring to FIG. 11(B), a second player character PC2 can move upward relative to first player character PC1, with ceiling T being the limit. Here, second player character PC2 moves upward and downward in accordance with a state of user's respiration. For example, when the user exhales, second player character PC2 moves upward from first player character PC 1, and when the user inhales, second player character PC2 moves downward to first player character PC1. In the present embodiment, a pulse rate of the user is calculated using the pulse wave signal above. When the pulse rate is increasing, it is determined that the user inhales, and when the pulse rate is decreasing, it is determined that the user exhales. In addition, 100 points are given as initial points, and the point is deducted when second player character PC2 comes in contact with ceiling T, which is an obstacle, or when first player character PC1 comes in contact with ground B, which is an obstacle.

Referring to FIG. 11(C), player character PC can fly along ground B with its attitude being inclined. Here, it is assumed that a flying attitude of player character PC is inclined depending on inclination of controller 22. For example, when the user directs controller 22 toward monitor 34 and inclines controller 22 by an angle $\alpha 1$ to the right, in synchronization with that inclination operation, player character PC is displayed in a manner also inclined by angle $\alpha 1$ to the right.

With such a scheme, the user can operate first and second player characters PC1 and PC2 in the virtual game world using vital sensor 78.

A data configuration of a wireless packet output from controller 22 to game device 12 and used in game processing will be described with reference to FIG. 12.

In the present embodiment, a wireless packet is generated in accordance with the input data in controller 22, in compliance with the mode of the communication scheme, and the generated wireless packet is output to game device 12.

Figure 12:
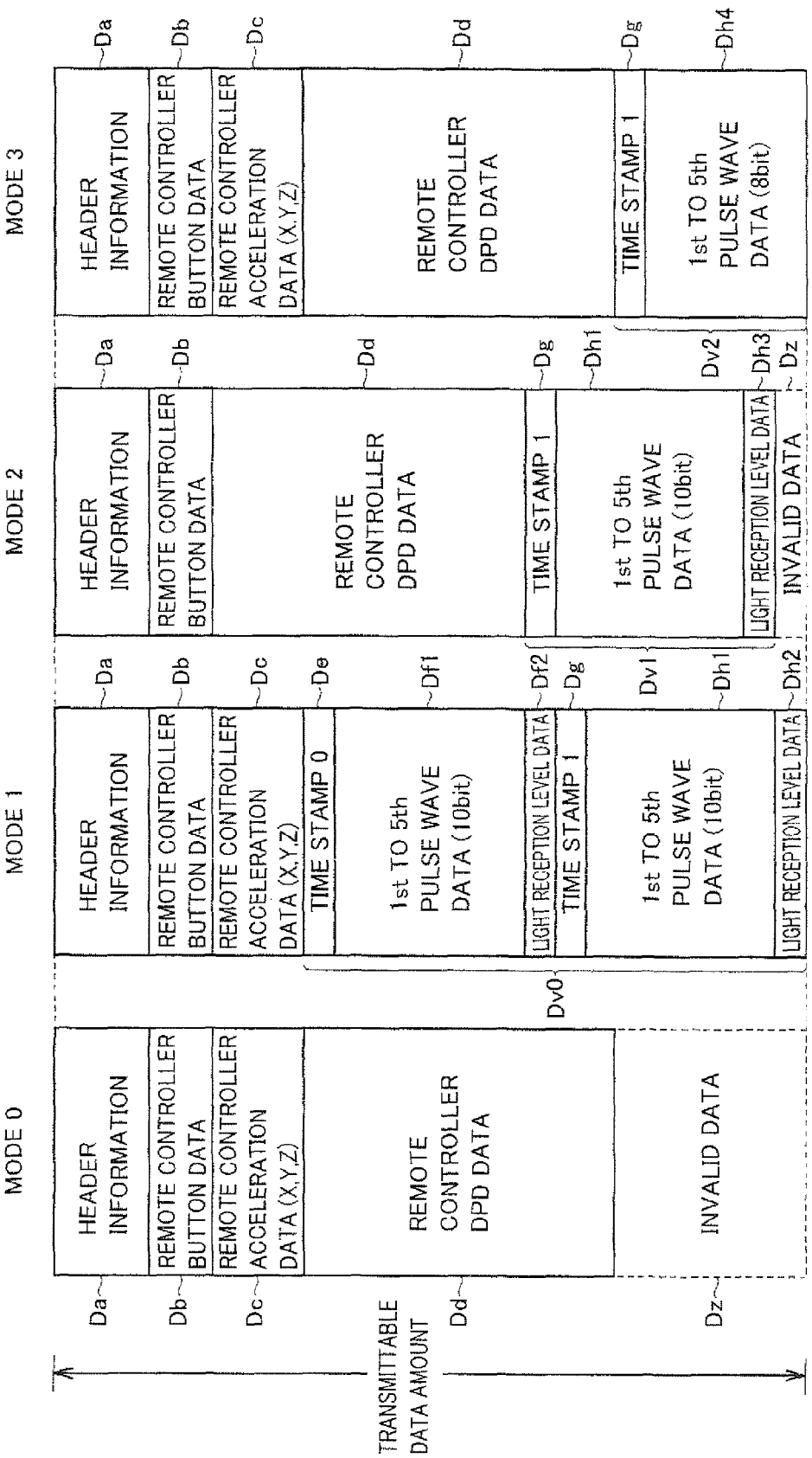
FIG. 12 is a diagram illustrating a data configuration of a wireless packet output from controller 22 to a game device 12 and used in game processing.

Referring to FIG. 12, wireless packets in four patterns, that are output to game device 12 in compliance with the modes of the communication scheme, are shown here.

Specifically, examples of wireless packets in four patterns of modes 0 to 3 are shown.

As shown in FIG. 12, an amount of data that can be transmitted to game device 12 in one wireless packet is predetermined, and various types of input data are output from wireless module 76 of controller 22 to game device 12, within a range of a transmittable amount of data.

Here, a wireless packet in mode 0 is constituted of header information Da including various types of control information on input data constituting the packet, remote controller button data Db, remote controller acceleration data (X, Y, Z) Dc, and remote controller DPD data Dd. It is noted that one wireless packet is transmitted, with invalid data Dz indicating that data is invalid being also added. In the present example, though a case where an amount of data transmitted in a wireless packet is the same in any mode and invalid data is added in an empty area is illustrated, an amount of data to be transmitted may be varied in accordance with a mode, by including an amount of data to be transmitted in header information.

Mode 0 is a communication scheme used when vital sensor 78 is not used. Modes 1 to 3 are communication schemes used when vital sensor 78 is connected to controller 22.

Processor 70 generates a wireless packet by reading the data once stored in memory 72, as described above.

Header information Da includes various types of information on the input data in a format of a wireless packet and information also on a type of a mode, such as information on mode 0 or the like.

Remote controller button data Db refers to operation data from input portion 26 (26a to 26i) of controller 22.

In addition, remote controller acceleration data (X, Y, Z) Dc refers to data indicating an acceleration value detected by acceleration sensor 74, with regard to an X-axis component, a Y-axis component and a Z-axis component.

Remote controller DPD data Dd refers to marker coordinate data calculated by image processing circuit 80d described above.

A wireless packet in the communication scheme in accordance with modes 1 to 3 will now be described.

A wireless packet in mode 1 is constituted of header information Da, remote controller button data Db, remote controller acceleration data (X, Y, Z) Dc, and biological information Dv0.

In a case of the communication scheme using vital sensor 78, in order to ensure reproducibility of a biological signal (a pulse wave signal) of the user in game device 12, the biological information relatively large in an amount of data should be transmitted to game device 12. Accordingly, taking into consideration a transmittable amount of data in one wireless packet, it is difficult to transmit the biological information together with remote controller DPD data Dd as included in the wireless packet. Therefore, a wireless packet including biological information Dv0 instead of remote controller DPD data Dd is transmitted.

Header information Da, remote controller button data Db, and remote controller acceleration data (X, Y, Z) Dc are the same as described above.

Biological information Dv0 includes a time stamp and biological information data constituted of pulse wave data and light reception level data.

Specifically, biological information Dv0 includes biological information data constituted of a time stamp 0 De, 1st to 5th pulse wave data Df1 and light reception level data Df2 corresponding to time stamp 0, as well as biological information data constituted of a time stamp 1 Dg, 1st to 5th pulse wave data Dh1 and light reception level data Dh2 corresponding to time stamp 1.

The time stamp refers to information indicating a time when processor 70 receives input of the biological information data from vital sensor 78 and causes memory 72 to store the data.

First to 5th pulse wave data Df1 and Dh1 represent five pieces of pulse wave data. Each piece of the pulse wave data has resolution, for example, of 10 bits.

The light reception level data refers to information obtained by A/D conversion of the light reception signal.

Biological information Dv0 includes 1st to 5th pulse wave data Df1 and Dh1 and light reception level data Df2 and Dh2 corresponding to time stamp 0 De and time stamp 1 Dg, respectively.

Here, 1st to 5th pulse wave data Df1 and light reception level data Df2 corresponding to time stamp 0 correspond to the immediately precedently obtained pulse wave data and light reception level data.

In addition, 1st to 5th pulse wave data Dh1 and light reception level data Dh2 corresponding to time stamp 1 correspond to the presently obtained pulse wave data and light reception level data.

According to such a data configuration, immediately preceding pulse wave data and light reception level data are included in a wireless packet. Therefore, as the immediately preceding pulse wave data is included in spite of packet loss of a preceding wireless packet, packet loss can be compensated for.

Namely, even when packet loss occurs due to communication failure during wireless communication, reproducibility of the biological signal (pulse wave signal) of the user in game device 12 can be ensured and a comfortable game operation can be achieved without user's game operation being interfered.

A wireless packet in mode 2 is constituted of header information Da, remote controller button data Db, remote controller DPD data Dd, and biological information Dv1.

Biological information Dv1 includes time stamp 1 Dg, 1st to 5th pulse wave data Dh1 and light reception level data Dh3 corresponding to time stamp 1 Dg.

This mode is directed to such a configuration that remote controller DPD data is included in a wireless packet instead of compensation data, as the configuration of the wireless packet.

Remote controller DPD data Dd and the biological information can be transmitted within a range of a transmittable amount of data, by excluding the compensation data.

Therefore, as the marker coordinate data can be transmitted while using vital sensor 78, a game operation can be performed by changing a position (coordinate) on the screen of monitor 34 indicated by controller 22 or by changing a distance between controller 22 and each of markers 340m and 340n, so that the user is able to perform a game operation high in a degree of freedom.

A wireless packet in mode 3 is constituted of header information Da, remote controller button data Db, remote controller acceleration data Dc, remote controller DPD data Dd, and biological information Dv2.

Biological information Dv2 includes time stamp 1 Dg and 1st to 5th pulse wave data Dh4 corresponding to time stamp 1 Dg.

This mode is directed to such a configuration that every remote controller information and reduced biological information are included in a wireless packet, by reducing the biological information.

Specifically, 1st to 5th pulse wave data Dh4 represent five pieces of pulse wave data, and it is assumed that each piece of pulse wave data is constituted, for example, of 8 bits. It is noted that light reception level data is not included.

According to this configuration, by adjusting an amount of data of biological information Dv2, all of remote controller button data Db, remote controller acceleration data (X, Y, Z) Dc, and the remote controller DPD data can be transmitted, and the remote controller button data, the acceleration data and the marker coordinate data can be transmitted while using vital sensor 78. Therefore, by using the data and utilizing all functions relating to input to controller 22, a game operation further higher in a degree of freedom can be performed.

A data configuration of a wireless packet in a format in compliance with each mode will be described with reference to FIG. 13.

Referring to FIG. 13, in mode 0, the remote controller button data, the remote controller acceleration data and the remote controller DPD data can be transmitted as the remote controller information. It is noted that biological information is not transmitted in mode 0.

In this case, vital sensor 78 is not used and a normal communication scheme is employed.

In mode 1, the biological information can be transmitted, together with the remote controller button data and the remote controller acceleration data as the remote controller information. The biological information includes five pieces of pulse wave data having resolution of 10 bits and includes immediately preceding five pieces of pulse wave data as the compensation data. In addition, the light reception level data includes one piece of light reception level data having resolution of 10 bits, for the five pieces of pulse wave data. The light reception level data is used for checking attachment of a finer. As it is only necessary to be able to sense attachment of a finger, one piece of light reception level data is provided for five pieces of pulse wave data, so that increase in a data amount of the biological information is suppressed.

In mode 2, the biological information can be transmitted together with the remote controller button data and the remote controller DPD data as the remote controller information. The biological information includes five pieces of pulse wave data having resolution of 10 bits. In addition, the light reception level data includes one piece of light reception level data for the five pieces of pulse wave data, and the light reception level data has resolution of 8 bits.

Though the description will be provided later, processor 70 reduces the 10-bit light reception level data output from vital sensor 78 and once stored in memory 72 to 8 bits, in creating a wireless packet. Though various methods can be used as a reduction method, for example, in the present example, higher 8 bits of the 10-bit light reception level data are extracted, that is, lower 2 bits are thinned out, to reduce the data amount.

The light reception level data is used for checking attachment of a finger, and it is only necessary to be able to sense attachment of a finger. Therefore, when it is not necessary to faithfully reproduce data, the data amount of the biological information is suppressed by reducing the data amount of the light reception level data. Thus, the remote controller DPD data can be included while transmittable amount of data is limited.

In mode 3, the biological information can be transmitted together with the remote controller button data, the remote controller acceleration data and the remote controller DPD data as the remote controller information. The biological information includes five pieces of pulse wave data having resolution of 8 bits. It is noted that the light reception level data is not included.

Though the description will be provided later, processor 70 reduces the 10-bit pulse wave data output from vital sensor 78 and once stored in memory 72 to 8 bits, in creating a wireless packet.

The modes in the above communication scheme in the present embodiment are set by the application of game device 12, and switching between the modes of the communication scheme can be made depending on a type of input data required by the application.

Specifically, in a case of an application utilizing the button data and the acceleration data of controller 22 and the biological information from the vital sensor, mode 1 is set.

Alternatively, in a case of an application utilizing the button data and the DPD data of controller 22 and the biological information from the vital sensor, mode 2 is set.

Alternatively, in a case of an application utilizing the button data, the acceleration data, and the DPD data of controller 22 and the biological information from the vital sensor, mode 3 is set.

By switching between the modes of the communication scheme, a relatively large amount of data such as the biological information can be transmitted while a transmittable data amount is limited and a function can be expanded by connecting vital sensor 78 to controller 22. Though modes 1 to 3 in the communication scheme utilizing vital sensor 78 have been described by way of example in the present example, the mode is not particularly limited to the above-described modes and a mode of another communication scheme can also be set. Specifically, so long as input data including at least one of operation data, acceleration data, marker coordinate data, and biological information data is adopted, combination thereof can freely be set.

Output of a wireless packet carried out by controller 22 will now be described.

Processing of a wireless packet performed by the communication unit of controller 22 will be described with reference to FIG. 14.

Figure 14:
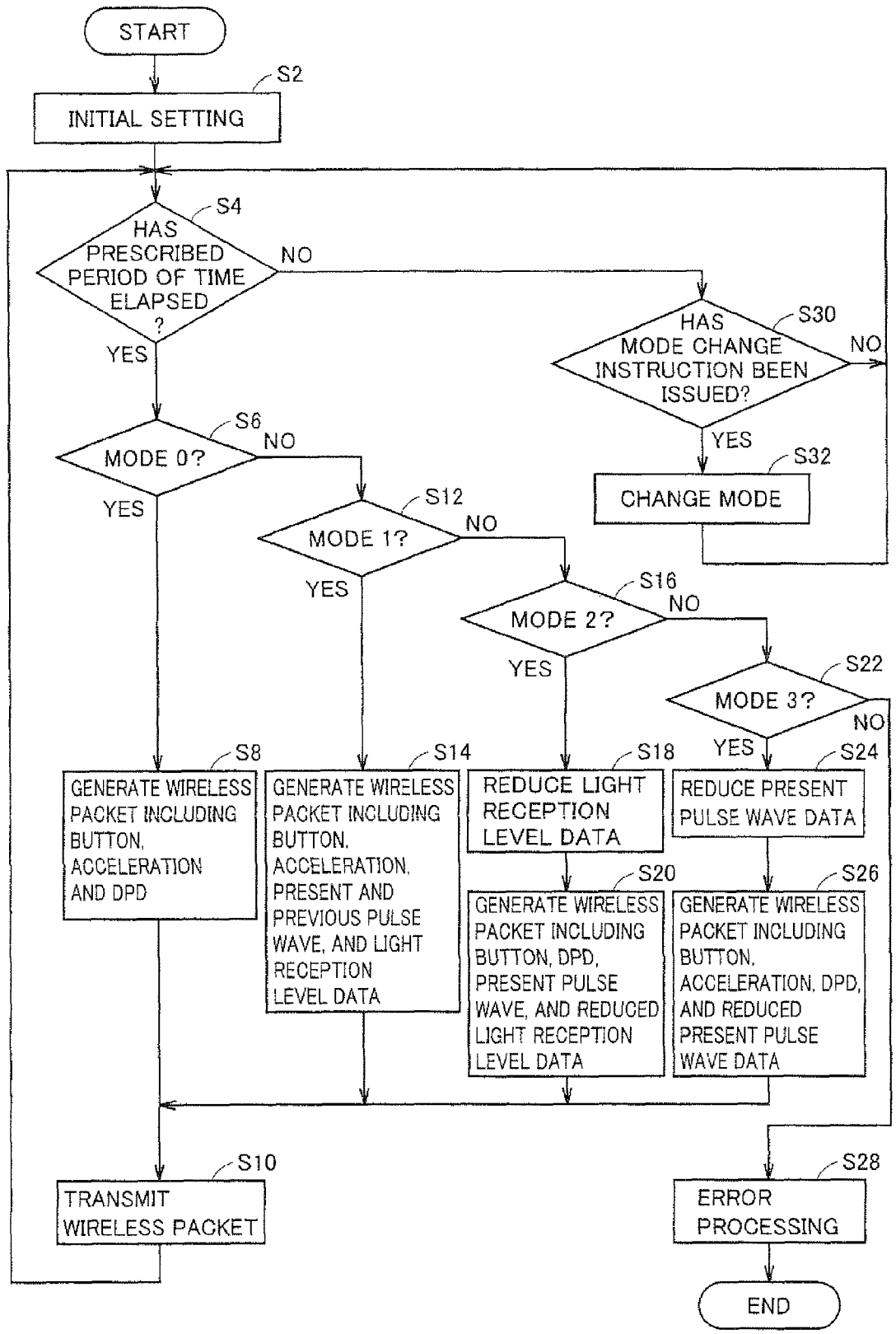
FIG. 14 is a diagram illustrating processing of a wireless packet performed by a communication unit of controller 22.

Referring to FIG. 14, initially, when an application is executed in game device 12, the communication unit makes initial setting for game device 12 (step S2).

Specifically, initially, a state of communication with game device 12 is checked, a communication scheme is set, and so on. Here, a protocol (arrangement) for a communication scheme between controller 22 and game device 12 is set by the application of game device 12. Specifically, a program for generating and transmitting a wireless packet in accordance with the format described in connection with FIG. 12 is transmitted from game device 12 to controller 22 and then stored in memory 72 of controller 22. Thereafter, in accordance with a mode change instruction issued from game device 12 to controller 22, a wireless packet in a format in accordance with the designated mode is generated by processor 70. Alternatively, a program for changing a format of a wireless packet in response to a mode change instruction may be stored in advance in memory 72. It is assumed that mode 0 is set as a communication scheme in an initial state.

Then, processor 70 determines whether a prescribed period of time (5 ms) has elapsed or not (step S4). When processor 70 has determined that the prescribed period of time has elapsed (YES in step S4), processor 70 then determines whether mode 0 is set or not (step S6).

When processor 70 has determined that mode 0 is set (YES in step S6), processor 70 generates a wireless packet including the remote controller button data, the remote controller acceleration data and the remote controller DPD data stored in memory 72 (step S8).

Then, processor 70 transmits the generated wireless packet to game device 12 through wireless module 76 (step S10). Then, the process again returns to step S4.

Wireless controller module 52 of game device 12 receives the wireless packet transmitted from controller 22 as described above. Then, game device 12 performs prescribed operation processing based on the input data representing the remote controller information included in the wireless packet.

On the other hand, when processor 70 has determined that mode 0 is not set (NO in step S6), processor 70 determines whether mode 1 is set or not (step S12).

When processor 70 has determined that mode 1 is set (YES in step S12), processor 70 generates a wireless packet including the remote controller information including the remote controller button data and the remote controller acceleration data stored in memory 72 and the biological information including the previous pulse wave data, the present pulse wave data and the light reception level data (step S14).

Then, processor 70 transmits the generated wireless packet to game device 12 through wireless module 76 (step S10). Then, the process again returns to step S4.

On the other hand, when processor 70 has determined that mode 1 is not set (NO in step S12), processor 70 determines whether mode 2 is set or not (step S16).

When processor 70 has determined that mode 2 is set (YES in step S16), the light reception level data is reduced (step S18). Specifically, the light reception level data having resolution of 10 bits is reduced to 8 bits.

More specifically, processor 70 reads the light reception level data (10 bits) output from vital sensor 78 and stored in memory 72 and extracts higher 8 bits to generate reduced light reception level data (8 bits).

Thereafter, processor 70 generates a wireless packet including the remote controller information including the remote controller button data and the remote controller DPD data stored in memory 72 and the biological information including the present pulse wave data and the reduced light reception level data (step S20).

Then, processor 70 transmits the generated wireless packet to game device 12 through wireless module 76 (step S10). Then, the process again returns to step S4.

On the other hand, when processor 70 has determined that mode 2 is not set (NO in step S16), processor 70 determines whether mode 3 is set or not (step S22).

When processor 70 has determined that mode 3 is set (YES in step S22), the present pulse wave data is reduced (step S24). Specifically, the pulse wave data having resolution of 10 bits is reduced to 8 bits.

More specifically, processor 70 reads the pulse wave data (10 bits) output from vital sensor 78 and stored in memory 72 and extracts higher 8 bits to generate reduced pulse wave data (8 bits).

Thereafter, processor 70 generates a wireless packet including the remote controller information including the remote controller button data, the remote controller acceleration data and the remote controller DPD data and the biological information including the present reduced pulse wave data (step S26).

Then, processor 70 transmits the generated wireless packet to game device 12 through wireless module 76 (step S10). Then, the process again returns to step S4.

On the other hand, when processor 70 has determined that mode 3 is not set (NO in step S22), processor 70 performs error processing, concluding that no defined mode is set (step S28). Then, the process ends. Namely, generation of a wireless packet is stopped.

On the other hand, when processor 70 has determined in step S4 that the prescribed period of time (5 ms) has not elapsed, processor 70 determines whether a mode change instruction has been issued or not (step S30).

When the mode change instruction has been issued in step S30 (YES in step S30), the mode of the communication scheme is changed (step S32). Then, the process returns to step S4.

On the other hand, when processor 70 has determined in step S30 that the mode change instruction has not been issued (NO in step S30), the process again returns to step S4.

According to the processing described above, the mode of the communication scheme is changed in response to the instruction from the application of game device 12 and a wireless packet in accordance with the resultant mode can be transmitted. Thus, even when a transmittable data amount is limited, a relatively large amount of data such as biological information can be transmitted. Namely, an input system of which function is expanded by connecting vital sensor 78, representing expansion equipment outputting a relatively large data amount, to controller 22 representing peripheral equipment can be configured.

In addition, in the present example, the vital sensor obtains biological information indicated by a pulse volume signal based on detection of volume change in a blood vessel with what is called an optical method, in which a part of a user's body (for example, a fingertip) is irradiated with infrared rays and the user's biological information is obtained based on a received quantity of infrared rays transmitted through the part of the body. The method, however, is not particularly limited thereto, and for example, the biological information can also be obtained by detecting pressure variation within the blood vessel caused by pulsation of an artery (for example, a piezoelectric method) to obtain a pulse pressure. Alternatively, a myoelectric potential or a cardiac potential of the user may be obtained as the user's biological information. The myoelectric potential or the cardiac potential can be detected with a common detection method using an electrode. For example, the user's biological information may be obtained based on variation or the like of a weak current in a user's body. Alternatively, a blood flow of the user may be obtained as the user's biological information. For example, the blood flow may be measured as pulsatile blood flow per one beat, by using an electromagnetic method, an ultrasonic method or the like, and that pulsatile blood flow may be obtained as the biological information. In addition, in order to obtain biological information, in the present example, a case where biological information is obtained at a finger portion of the user has been described, however, a vital sensor may be attached, for example, to a chest, an arm, an ear lobe, or the like, without limited to the finger portion.

In addition, in the present example, a case where a vital sensor representing expansion equipment that transmits a relatively large amount of data is attached for use to controller 22 has been described, however, the expansion equipment is not particularly limited to a vital sensor. Other expansion equipment attached for use to controller 22 is also similarly applicable. For example, in a case where yet another controller is attached for use to controller 22 (for example, controller being held with one hand while another controller being held with the other hand), when an amount of data transmitted from another controller is relatively large, data from controller 22 and data from another controller are included in one wireless packet by setting the communication scheme to a prescribed mode in accordance with the scheme as described above, so that a function of another controller representing expansion equipment can also be made use of. Namely, according to the present scheme, devices that can be connected as the expansion equipment can be various.

Moreover, in the present example, connection between vital sensor 78 and controller 22 through cable 79 has been described, however, biological information can also be transmitted from vital sensor 78 to controller 22 through wireless communication.

Further, in the example described above, such a scheme as reducing a data amount by thinning out data bits in pulse wave data or the like in order to suppress the data amount of biological information has been described. The data amount, however, may be reduced by compressing pulse wave data or the like, instead of thinning out. Specifically, processor 70 should only compress the pulse wave data or the like from 10 bits to 8 bits by using a compression application stored in memory 72. The compression application may be provided in advance in memory 72. Alternatively, in the present embodiment, as game device 12 can control controller 22 through communication, the compression application may be transmitted from game device 12 and stored in memory 72. Then, the compressed pulse wave data or the like is restored to original 10-bit data by using a decompression application paired with the compression application and stored in flash memory 44 or the like under the control of CPU 40 in game device 12, so that highly accurate biological information can be obtained. It is noted that the decompression application paired with the compression application may be provided in advance in flash memory 44 or the like in game device 12, or the decompression application written in optical disc 18 may be stored in flash memory 44 or the like in loading optical disc 18 in disc drive 54 of game device 12.

In addition, regarding a scheme for reducing a data amount of pulse wave data, it is also possible to suppress the data amount of biological information by adjusting the number of pieces of pulse wave data to be transmitted, instead of compression. Specifically, a sampling frequency for A/D conversion in control unit 761 of vital sensor 78 is made variable and controller 22 is controlled by the application of game device 12 to adjust a sampling period (or the sampling frequency) for A/D conversion of vital sensor 78. For example, by adjusting a sampling period of 1 ms (or the sampling frequency) for A/D conversion of vital sensor 78 to 2.5 ms, the number of pieces of pulse wave data transmitted at prescribed intervals of 5 ms can be adjusted to two. By thus adjusting the number of pieces of pulse wave data to be transmitted, the data amount of the biological information can be suppressed.

In addition, in the present example, a configuration in which controller 22 representing the peripheral equipment of game device 12 is connected to expansion equipment has been described, however, the peripheral equipment is not particularly limited to controller 22. Any peripheral equipment that can be connected to expansion equipment and can generate data and include a communication unit for transmission is also similarly applicable.

Another Embodiment

In the embodiments described above, game device 12 has been illustrated by way of a representative example of the information processing device according to the present invention, however, the information processing device is not limited thereto. Namely, an application executable by a personal computer may be provided as a program according to the present invention. Here, the program according to the present invention may be incorporated as a partial function of various applications executed on the personal computer.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An input system constituted of peripheral equipment for transmitting data to an information processing device and expansion equipment that can be connected to said peripheral equipment,
   said peripheral equipment including
      a first data generation unit for generating first input data, and
      a communication unit capable of transmitting a prescribed amount of transmission data to said information processing device,
   said expansion equipment including an expansion equipment data generation unit for generating expansion equipment data, and
   said communication unit transmitting, in a first mode, said first input data generated by said first data generation unit in such a manner that it is included in said transmission data, and transmitting, in a second mode, said expansion equipment data input from said expansion equipment in such a manner that it is included in said transmission data, instead of said first input data.

2. The input system according to claim 1, wherein
   said peripheral equipment further includes a second data generation unit for generating second input data, and
   said communication unit transmits, in said first mode, said first and second input data in such a manner that they are included in said transmission data, and transmits, in said second mode, said second input data generated by said second data generation unit and said expansion equipment data in such a manner that they are included in said transmission data.

3. The input system according to claim 2, wherein
   said communication unit has a transmission data generation unit for generating said transmission data, and
   in a third mode, said transmission data generation unit generates reduced expansion equipment data obtained by reducing a data amount of said expansion equipment data input from said expansion equipment and generates said transmission data including said first and second input data and said reduced expansion equipment data.

4. The input system according to claim 2, wherein
   said second input data is acceleration data.

5. The input system according to claim 1, wherein
   said communication unit establishes wireless communication with said information processing device.

6. The input system according to claim 1, wherein
   said expansion equipment and said peripheral equipment are connected through a wire to each other.

7. The input system according to claim 1, wherein
   said communication unit has a transmission data generation unit for generating said transmission data, and
   in a third mode, said transmission data generation unit generates reduced expansion equipment data obtained by reducing a data amount of said expansion equipment data input from said expansion equipment and generates said transmission data including said first input data and said reduced expansion equipment data.

8. The input system according to claim 6, wherein
   said expansion equipment data includes compensation data for compensating for data, and
   said transmission data generation unit generates, in said third mode, said reduced expansion equipment data without including said compensation data.

9. The input system according to claim 6, wherein
   said expansion equipment data generation unit outputs, as said expansion equipment data, a plurality of pieces of data in accordance with a sampling frequency that can be adjusted in response to an instruction to said peripheral equipment, and
   said transmission data generation unit indicates adjustment of said sampling frequency of said expansion equipment.

10. The input system according to claim 6, wherein
    said expansion equipment data is constituted of a plurality of pieces of data each constituted of a plurality of bits, and
    said transmission data generation unit generates said reduced expansion equipment data in which the number of bits in each piece of data has been reduced.

11. The input system according to claim 6, wherein
    said reduced expansion equipment data is smaller in a data amount than said expansion equipment data.

12. The input system according to claim 1, wherein
    said first input data is coordinate indication data.

13. The input system according to claim 1, wherein
    said peripheral equipment includes an image pick-up portion for obtaining picked-up image data, and
    said first input data is the picked-up image data itself obtained by said image pick-up portion or data obtained by subjecting the picked-up image data obtained by said image pick-up portion to prescribed operation processing.

14. The input system according to claim 1, wherein
    said expansion equipment data is biological information data.

15. An information processing system, comprising:
    an information processing device,
    operation equipment for said information processing device; and
    expansion equipment that can be connected to said operation equipment, said operation equipment including
an operation data generation unit for generating operation data,
a coordinate indication data generation unit for generating coordinate indication data, and
a communication unit capable of transmitting a prescribed amount of transmission data to said information processing device,
said expansion equipment including an expansion equipment data generation unit for generating expansion equipment data, and
said communication unit transmitting, in a first mode, said operation data generated by said operation data generation unit and said coordinate indication data generated by said coordinate indication data generation unit in such a manner that they are included in said transmission data, and transmitting, in a second mode, said operation data and said expansion equipment data input from said expansion equipment in such a manner that they are included in said transmission data, instead of said coordinate indication data.

* * * * *